(12) United States Patent
Ochi et al.

(10) Patent No.: US 11,356,330 B2
(45) Date of Patent: Jun. 7, 2022

(54) COMMUNICATION DEVICE AND COMMUNICATION METHOD

(71) Applicant: OKI ELECTRIC INDUSTRY CO., LTD., Tokyo (JP)

(72) Inventors: Kengo Ochi, Tokyo (JP); Jin Nomura, Tokyo (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 226 days.

(21) Appl. No.: 16/744,492

(22) Filed: Jan. 16, 2020

(65) Prior Publication Data
US 2020/0274770 A1 Aug. 27, 2020

(30) Foreign Application Priority Data

Feb. 27, 2019 (JP) .............................. JP2019-033797
Feb. 27, 2019 (JP) .............................. JP2019-033800

(51) Int. Cl.
*H04L 41/12* (2022.01)

(52) U.S. Cl.
CPC .................................... *H04L 41/12* (2013.01)

(58) Field of Classification Search
CPC ............................ H04L 41/12; H04L 61/2015
See application file for complete search history.

(56) References Cited

U.S. PATENT DOCUMENTS

| | | | | |
|---|---|---|---|---|
| 7,882,169 B1* | 2/2011 | Droms | ................ | H04L 61/2015 709/203 |
| 9,386,047 B2* | 7/2016 | Wang | ................. | H04L 65/1069 |
| 2002/0059426 A1* | 5/2002 | Brinkerhoff | ............ | H04L 47/32 709/226 |
| 2005/0264420 A1* | 12/2005 | Vogel | ................ | H04L 29/12216 340/572.1 |
| 2009/0215438 A1* | 8/2009 | Mittal | ................. | H04L 65/1046 455/418 |
| 2010/0082779 A1* | 4/2010 | Min | ..................... | H04L 61/2015 709/220 |
| 2011/0276814 A1* | 11/2011 | Kamijima | ............. | G06F 1/3203 713/320 |
| 2013/0097335 A1* | 4/2013 | Jiang | ....................... | H04L 69/22 709/245 |
| 2014/0344475 A1* | 11/2014 | Chen | ................... | H04L 61/2053 709/245 |
| 2015/0019266 A1* | 1/2015 | Stempora | ............... | G06Q 40/08 705/4 |
| 2017/0251079 A1* | 8/2017 | Duckett | ............. | H04L 61/2015 |
| 2018/0145746 A1* | 5/2018 | Finkelstein | ............ | H04L 69/08 |

FOREIGN PATENT DOCUMENTS

JP 2004297475 A 10/2004

* cited by examiner

*Primary Examiner* — Eyob Hagos
(74) *Attorney, Agent, or Firm* — Panitch Schwarze Belisario & Nadel LLP

(57) ABSTRACT

A communication device includes a communication section and a controller. The communication section is communicable with a network apparatus via a relay device. The controller controls an operation of the communication section, thereby causes the communication section to transmit one or more search packets to the relay device, and causes the communication section to start communicating with the network apparatus after receiving any of the one or more search packets. The one or more search packets include the communication section as a transmission target.

10 Claims, 21 Drawing Sheets

COMMUNICATION DEVICE AND COMMUNICATION METHOD

CROSS-REFERENCE TO RELATED APPLICATIONS

The present application claims priority from Japanese Patent Application No. 2019-033797 filed on Feb. 27, 2019 and Japanese Patent Application No. 2019-033800 filed on Feb. 27, 2019, the entire contents of which are hereby incorporated by reference.

BACKGROUND

The technology relates to a communication device and a communication method that performs communication with a network apparatus via a relay device.

In network communication, communication is often carried out via a relay device. There exists a relay device that detects the presence of a loop transmission path by performing a path search operation through a spanning tree protocol, as disclosed in Japanese Unexamined Patent Application Publication No. 2004-297475, for example.

SUMMARY

It is desired for a communication device to start network communication within a short time after performing a path search operation through a spanning tree protocol, and a further reduction in the time leading up to the start of network communication is expected.

It is desirable to provide a communication device and a communication method that allow a time leading up to start of network communication to be reduced.

According to one embodiment of the technology, there is provided a communication device that includes a communication section and a controller. The communication section is communicable with a network apparatus via a relay device. The controller controls an operation of the communication section, thereby causes the communication section to transmit one or more search packets to the relay device, and causes the communication section to start communicating with the network apparatus after receiving any of the one or more search packets. The one or more search packets include the communication section as a transmission target.

According to one embodiment of the technology, there is provided a communication method including: transmitting one or more search packets to a relay device, the one or more search packets including a sender of the one or more search packets as a transmission target; and starting communicating with a network apparatus via the relay device after receiving any of the one or more search packets.

DETAILED DESCRIPTION

Figure 1:
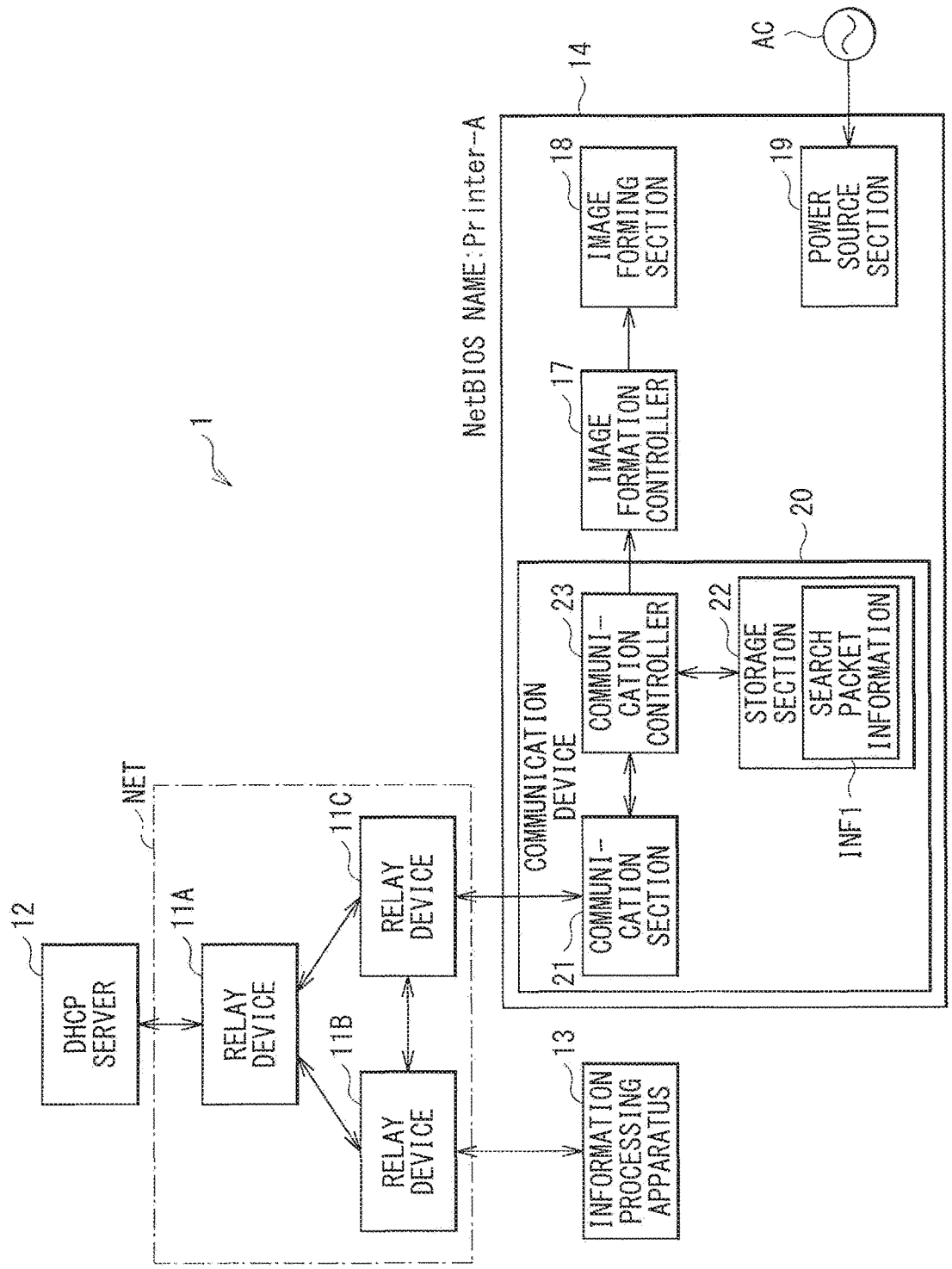
FIG. 1 is a block diagram illustrating an example of a configuration of a communication system according to one example embodiment.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.
1. First Example Embodiment
2. Second Example Embodiment
3. Third Example Embodiment
4. Fourth Example Embodiment 1. First Example Embodiment Configuration Example FIG. 1 illustrates an example of a configuration of a communication system 1. The communication system 1 may include a communication device according to a first example embodiment of the technology. The communication system 1 may include a redundant network. A communication method according to an example embodiment of the technology may be implemented through the present example embodiment and is thus described in conjunction with the present example embodiment. The communication system 1 may include a plurality of relay devices 11, a dynamic host configuration protocol (DHCP) server 12, an information processing apparatus 13, and an image forming apparatus 14. In this example, the communication system 1 may include three relay devices 11A, 11B, and 11C.

The relay devices 11 may each serve as a hub that relays network communication. Each relay device 11 may include a plurality of unillustrated ports. The relay device 11 may be configured to be coupled to a plurality of network apparatuses via these ports. The relay device 11 may control communication with the use of a spanning tree protocol. In a specific but non-limiting example, the relay device 11 may detect the presence of a loop transmission path by performing a path search operation with the use of the spanning tree protocol. In a case where the loop transmission path is present, the relay device 11 may so control the communication as to keep a network packet from being transmitted in a loop.

In this example, the relay device 11A may be coupled to the relay devices 11B and 11C and the DHCP server 12 via a local area network (LAN) cable, for example. The relay device 11B may be coupled to the relay devices 11A and 11C and the information processing apparatus 13 via a LAN cable, for example. The relay device 11C may be coupled to the relay devices 11A and 11B and the image forming apparatus 14 via a LAN cable, for example. As illustrated in FIG. 1, the relay devices 11A, 11B, and 11C may include a loop transmission path. In other words, the relay devices 11A, 11B, and 11C may form a redundant network, i.e., a network NET.

For example, in a case where a network apparatus newly becomes electrically coupled to the network NET, the relay devices 11A, 11B, and 11C may detect a loop transmission path by performing the path search operation with the use of the spanning tree protocol. During a period in which the relay devices 11A, 11B, and 11C perform the path search operation, the relay devices 11A, 11B, and 11C may cut off communication with devices other than the relay devices 11A, 11B, and 11C. Furthermore, on the basis of a processing result of the path search operation, the relay devices 11A, 11B, and 11C may so control the communication as to keep a network packet from being transmitted in a loop.

The DHCP server 12 may be configured to assign an Internet Protocol (IP) address to a network apparatus coupled to the network NET, such as the information processing apparatus 13 or the image forming apparatus 14. In this example, the DHCP server 12 may be coupled to the relay device 11A. Furthermore, the DHCP server 12 may communicate with a network apparatus via the network NET and assign an IP address to that network apparatus on the basis of a request from the network apparatus.

In this example, the information processing apparatus 13 may be a so-called personal computer. In this example, the information processing apparatus 13 may be coupled to the relay device 11B. The information processing apparatus 13 may generate print data on the basis of a user operation and transmit the generated print data to the image forming apparatus 14 via the network NET.

The image forming apparatus 14 may be configured to form an image on a recording medium, such as paper, on the basis of the print data. In this example, the image forming apparatus 14 may be coupled to the relay device 11C. The image forming apparatus 14 may form an image on a recording medium on the basis of the print data transmitted from the information processing apparatus 13 via the network NET. A NetBIOS name of the image forming apparatus 14 may be set to "Printer-A." The image forming apparatus 14 may include a communication device 20, an image formation controller 17, an image forming section 18, and a power source section 19.

The communication device 20 may be coupled to the relay device 11C. The communication device 20 may be configured to communicate with the DHCP server 12 and the information processing apparatus 13 via the network NET. In a specific but non-limiting example, the communication device 20 may acquire an IP address assigned by the DHCP server 12 by communicating with the DHCP server 12 via the network NET. Furthermore, the communication device 20 may receive print data transmitted from the information processing apparatus 13, by communicating with the information processing apparatus 13 via the network NET with the use of the acquired IP address, for example. The communication device 20 may include a communication section 21, a storage section 22, and a communication controller 23.

The communication section 21 may be configured to communicate with the DHCP server 12 and the information processing apparatus 13 by transmitting and/or receiving a network packet via the network NET.

Furthermore, as will be described later, in a case where the relay devices 11A, 11B, and 11C are performing the path search operation and have cut off communication with devices other than the relay devices 11A, 11B, and 11C, the communication section 21 may transmit a plurality of search packets P intermittently to search for the image forming apparatus 14 which includes the communication section 21. At this point, the communication section 21 may transmit the search packets P through broadcasting. In this example, a search packet P may be a network packet of a "NetBIOS Name Service" format. In this search packet P, a "Queries" parameter may be set to "Printer-A," which is the NetBIOS name of the image forming apparatus 14 including the communication section 21. The communication section 21 may transmit this search packet P through broadcasting with the use of User Datagram Protocol (UDP) Port 137.

In this example, a network packet of the "NetBIOS Name Service" format may be applied to a search packet P, but this is not a limiting example. For example, a network packet used in a "Web Services on Devices (WSD)" protocol or a network packet used in a "multicast DNS" protocol may also be applied to a search packet P.

The storage section 22 may include a nonvolatile memory. The storage section 22 may hold search packet information INF1. The search packet information INF1 may include information on a search packet P to be transmitted by the communication section 21.

The communication controller 23 may be configured to control a communication operation of the communication device 20. The communication controller 23 may include, for example but not limited to, a processor and a random access memory (RAM). The communication controller 23 may perform control of causing the communication section 21 to transmit a network packet requesting the DHCP server 12 to assign an IP address. In a case where the communication section 21 receives a network packet transmitted from the DHCP server 12 and including information on an assigned IP address, the communication controller 23 may acquire the assigned IP address on the basis of the received network packet and perform the network setting on the basis of the acquired IP address. Furthermore, the communication controller 23 may perform control of causing the communication section 21 to communicate with a network apparatus with the use of the acquired IP address. For example, in a case where the communication section 21 receives print data transmitted from the information processing apparatus 13, by communicating with the information processing apparatus 13 with the use of the acquired IP address, the communication controller 23 may supply the received print data to the image formation controller 17.

Furthermore, in a case where the relay devices 11A, 11B, and 11C are performing the path search operation and have cut off communication with devices other than the relay devices 11A, 11B, and 11C, for example, the communication controller 23 may perform control of causing the communication section 21 to transmit a plurality of search packets P intermittently on the basis of the search packet information INF1 stored in the storage section 22. Thereafter, in a case where the communication section 21 receives any of the transmitted search packets P, the communication controller 23 may perform control of causing the communication section 21 to stop transmitting a search packet P and to start the network communication.

The image formation controller 17 may be configured to control an operation of the image forming section 18 on the basis of the print data supplied from the communication device 20.

The image forming section 18 may be configured to form an image on a recording medium, such as paper, on the basis of an instruction from the image formation controller 17.

The power source section 19 may be configured to generate a power source electric power to be used in the communication device 20, the image formation controller 17, and the image forming section 18 on the basis of an alternating-current electric power supplied from an alternating-current power source AC, such as a commercial power source, for example. The power source section 19 may generate a power source electric power by the user's turning-on of a power source switch, for example. Furthermore, the power source section 19 may supply the generated power source electric power to the communication device 20, the image formation controller 17, and the image forming section 18.

With the configuration described above, in the communication system 1, the communication device 20 may transmit a plurality of search packets P intermittently during a period in which the relay devices 11A, 11B, and 11C are performing the path search operation and have cut off communication with devices other than the relay devices 11A, 11B, and 11C, i.e., during a communication cutoff period T. Furthermore, in a case where the communication device 20 receives any of the transmitted search packets P, the communication device 20 may determine that the communication cutoff period T has ended. Thus, the communication device 20 may stop transmitting a search packet P and start communicating with the network apparatus. This makes it possible to reduce the time leading up to the start of the network communication in the communication system 1.

The communication section 21 may correspond to a "communication section" in one specific but non-limiting embodiment of the technology. The communication controller 23 may correspond to a "controller" in one specific but non-limiting embodiment of the technology. The relay device 11C may correspond to a "relay device" in one specific but non-limiting embodiment of the technology. The DHCP server 12 may correspond to a "network apparatus" in one specific but non-limiting embodiment of the technology. The search packet P may correspond to a "search packet" in one specific but non-limiting embodiment of the technology.

[Example Operations and Example Workings]

Next, example operations and example workings of the communication device 20 according to the first example embodiment will be described.

[Overview of Overall Operation]

First, with reference to FIG. 1, an overview of an overall operation of the communication system 1 will be described. The relay devices 11A, 11B, and 11C may relay network communication. The communication device 20 of the image forming apparatus 14 may acquire an IP address assigned by the DHCP server 12 by communicating with the DHCP server 12 via the network NET. The communication device 20 of the image forming apparatus 14 may receive print data transmitted from the information processing apparatus 13, by communicating with the information processing apparatus 13 via the network NET. The image forming apparatus 14 may form an image on a recording medium, such as paper, in accordance with the received print data.

In a case where a network apparatus newly becomes electrically coupled to the network NET, the relay devices 11A, 11B, and 11C may detect a loop transmission path by performing the path search operation with the use of the spanning tree protocol. During the period in which the relay devices 11A, 11B, and 11C perform the path search operation, the relay devices 11A, 11B, and 11C may cut off communication with devices other than the relay devices 11A, 11B, and 11C. During this period, i.e., the communication cutoff period T, the communication device 20 of the image forming apparatus 14 may transmit a plurality of search packets P intermittently. In a case where the communication device 20 has received any of the transmitted search packets P, the communication device 20 may stop transmitting a search packet P and start the network communication.

[Detailed Operation]

Figure 2:
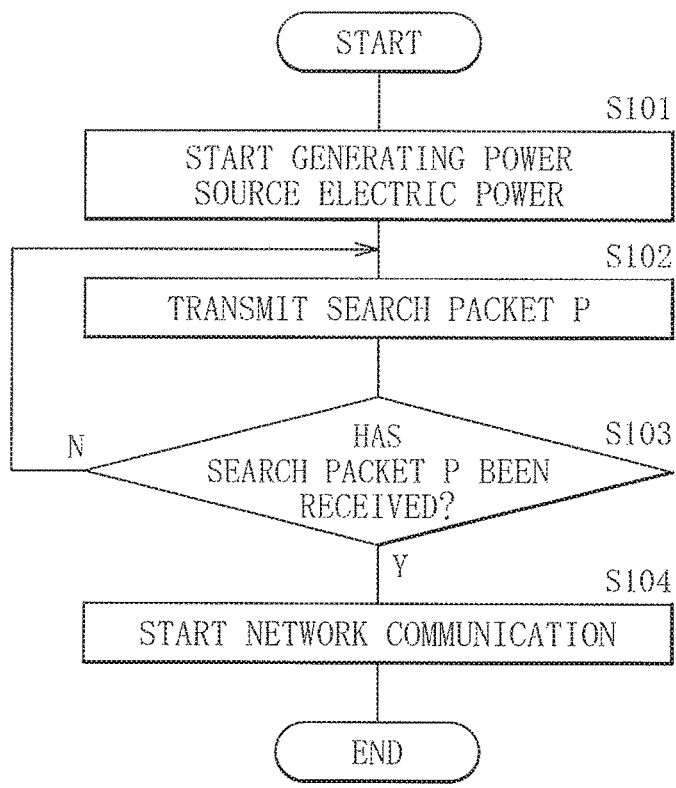
FIG. 2 is a flowchart illustrating an example of an operation of a communication device illustrated in FIG. 1.
Figure 3:
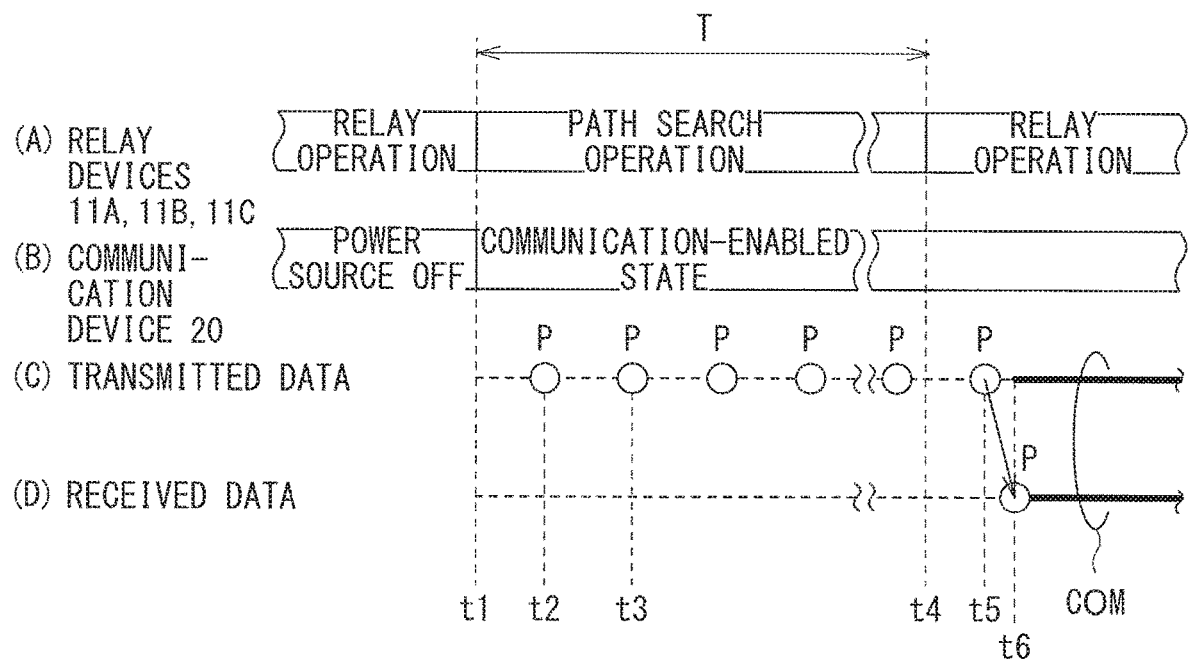
FIG. 3 is a timing chart illustrating an example of an operation of a communication system illustrated in FIG. 1.

FIG. 2 illustrates an example of an operation of the communication device 20 performed when the user turns on the power source switch of the image forming apparatus 14. FIG. 3 illustrates an example of an operation of the communication system 1. Part (A) illustrates an operation of the relay devices 11A, 11B, and 11C. Part (B) illustrates an operation of the communication device 20. Part (C) illustrates data transmitted by the communication device 20. Part (D) illustrates data received by the communication device 20. In the example described below, the relay device 11C and the image forming apparatus 14 may become electrically coupled to each other by the user's turning-on of the power source switch of the image forming apparatus 14, but this is not a limiting example. For example, the operation may be similar in a case where the relay device 11C and the image forming apparatus 14 become electrically coupled to each other by the user's physically coupling the image forming apparatus 14 whose power source switch is in an on state to the relay device 11C with the use of a LAN cable.

In step S101, when the user turns on the power source switch of the image forming apparatus 14, the power source section 19 may start generating a power source electric power to be used in the communication device 20, the image formation controller 17, and the image forming section 18 on the basis of an alternating-current electric power supplied from the alternating-current power source AC.

In the example illustrated in FIG. 3, the relay devices 11A, 11B, and 11C may be performing an operation of relaying the network communication during a period preceding a timing t1, as illustrated in Part (A) of FIG. 3. Furthermore, since the power source switch of the image forming apparatus 14 is in an off state during this period, no power source electric power may be supplied to the communication device 20, as illustrated in Part (B) of FIG. 3.

At the timing t1, the user may turn on the power source switch of the image forming apparatus 14. This may cause the power source electric power generated by the power source section 19 to be supplied to the communication device 20, and the communication device 20 may start operating. As a result, the communication device 20 may enter a communication-enabled state, as illustrated in Part (B) of FIG. 3.

When the communication device 20 starts operating in this manner, the image forming apparatus 14 may become electrically coupled to the relay device 11C. When electrical coupling between the relay device 11C and the image forming apparatus 14 is detected, the relay devices 11A, 11B, and 11C may perform the path search operation with the use of the spanning tree protocol, as illustrated in Part (A) of FIG. 3. This may cause the relay devices 11A, 11B, and 11C to cut off communication with devices other than the relay devices 11A, 11B, and 11C. In this manner, the communication cutoff period T may start.

Thereafter, the communication device 20 may transmit a search packet P in step S102. In a specific but non-limiting example, the communication controller 23 may generate a search packet P on the basis of the search packet information INF1 stored in the storage section 22, and the communication section 21 may transmit the generated search packet P through broadcasting.

Thereafter, in step S103, the communication controller 23 of the communication device 20 may determine whether the communication section 21 has received the search packet P transmitted in step S102. In a case where the communication section 21 has not received the search packet P ("N" in step S103), the flow may return to step S 102, and steps S102 and S103 may be repeated until the communication device 20 receives a search packet P.

In the example illustrated in FIG. 3, the communication device 20 may transmit a first search packet P at a timing t2, as illustrated in Part (C) of FIG. 3. This search packet P may be lost since the relay devices 11A, 11B, and 11C have cut off communication with devices other than the relay devices 11A, 11B, and 11C. The communication device 20 may not receive this search packet P, and therefore, the communication device 20 may transmit a next search packet P at a timing t3. In this manner, the communication device 20 may transmit a plurality of search packets P intermittently at a predetermined time interval, e.g., at an interval of three seconds, in this example.

In a case where the communication section 21 receives the search packet P in step S103 ("Y" in step S103), the communication device 20 may start the network communication in step S104. In other words, in a case where the communication section 21 receives the search packet P, the communication device 20 may determine that the communication cutoff period T has ended and start the network communication.

In the example illustrated in FIG. 3, the relay devices 11A, 11B, and 11C may end the path search operation at a timing t4, as illustrated in Part (A) of FIG. 3. This may cause the relay devices 11A, 11B, and 11C to cancel the cutoff of communication with devices other than the relay devices 11A, 11B, and 11C. In this manner, the communication cutoff period T may end. Thereafter, the relay devices 11A, 11B, and 11C may resume the operation of relaying the network communication. On the basis of the processing result of the path search operation, the relay devices 11A, 11B, and 11C may so control the communication as to keep a network packet from being transmitted in a loop.

At a timing t5 thereafter, the communication device 20 may transmit a search packet P, as illustrated in Part (C) of FIG. 3. This search packet P may serve to search for the apparatus including the communication device 20 and may be broadcast. Therefore, the relay device 11C may transmit this search packet P to the relay devices 11A and 11B and also transmit this search packet P to the communication device 20. Accordingly, the communication device 20 may receive this search packet P at a timing t6, as illustrated in Part (D) of FIG. 3. This may cause the communication device 20 to determine that the communication cutoff period T has ended, and the communication device 20 may start network communication COM, as illustrated in Parts (C) and (D) of FIG. 3.

At or after the timing t6, the communication device 20 may transmit, to the DHCP server 12, a network packet requesting the DHCP server 12 to assign an IP address and receive a network packet transmitted from the DHCP server 12 and including information on the assigned IP address. Thereafter, the communication controller 23 of the communication device 20 may acquire the IP address assigned by the DHCP server 12 on the basis of the received network packet and perform network setting on the basis of the acquired IP address. Thereafter, the communication device 20 may be able to carry out the network communication with the use of the acquired IP address. For example, the communication device 20 may receive print data transmitted from the information processing apparatus 13, by communicating with the information processing apparatus 13 via the relay devices 11A, 11B, and 11C, i.e., via the network NET. Thereafter, the image forming apparatus 14 may form an image on a recording medium, such as paper, in accordance with the received print data.

Thus, the flow may be terminated.

In this manner, the communication device 20 may start transmitting a plurality of search packets P in a case where the image forming apparatus 14 becomes electrically coupled to the relay device 11C and start the network communication in a case where the communication device 20 receives any of the transmitted search packets P. This makes it possible to reduce the time leading up to the start of the network communication from the end of the communication cutoff period T in the communication system 20.

In other words, in one example, the communication device may be configured to start the network communication upon a lapse of a predetermined standby time after the image forming apparatus becomes electrically coupled to the relay device. In this case, for example, even in a case where the path search operation ends in a short time, the communication device may refrain from starting the network communication until the standby time passes. Therefore, there is a possibility that the time leading up to the start of the network communication from the end of the communication cutoff period T may increase. Furthermore, in a case where the configuration of the network is changed, the duration for which the path search operation is performed may vary, and the length of the communication cutoff period T may vary. Therefore, in a case where a manager is to set the standby time appropriately in order to reduce the time leading up to the start of the network communication, for example, the manager may need to reset the standby time each time the configuration of the network is changed, and this may lead to an increased trouble for the manager.

In contrast, the communication device 20 may start transmitting a plurality of search packets P in a case where the image forming apparatus 14 becomes electrically coupled to the relay device 11C and start the network communication in a case where the communication device 20 receives any of the transmitted search packets P. This allows the communication device 20 to start the network communication after confirming that the communication cutoff period T has ended. It is therefore possible to appropriately set the timing of starting the network communication in accordance with the length of the communication cutoff period T. In a specific but non-limiting example, the timing of starting the network communication may be moved up in a case where the communication cutoff period T is short, or the timing of starting the network communication may be delayed in a case where the communication cutoff period T is long. In this manner, since it is possible to appropriately set the timing of starting the network communication in the communication device 20 in accordance with the length of the communication cutoff period T, it is possible to reduce the time leading up to the start of the network communication from the end of the communication cutoff period T in the communication device 20. Furthermore, even in a case where the configuration of the network is changed, it is possible to set the timing of starting the network communication appropriately in the communication device 20 in accordance with the length of the communication cutoff period T. Accordingly, the manager does not need to set the standby time, and this makes it possible to reduce the trouble for the manager.

[Example Effects]

As described above, in the first example embodiment, a plurality of search packets may start being transmitted in a case where the image forming apparatus becomes electrically coupled to the relay device, and the network communication may be started in a case where any of the transmitted search packets is received. Therefore, it is possible to appropriately set the timing of starting the network communication in accordance with the length of the communication cutoff period, and it is therefore possible to reduce the time leading up to the start of the network communication.

Modification Example 1-1

As illustrated in FIG. 2, in the foregoing example embodiment, the communication device 20 may start the network communication in a case where the communication device 20 receives a search packet P transmitted by itself, but this is not a limiting example. Alternatively, a communication device may start the network communication in a case where the communication device receives a network packet other than a search packet P, for example. Such a modification example 1-1 will be described below in detail.

Figure 4:
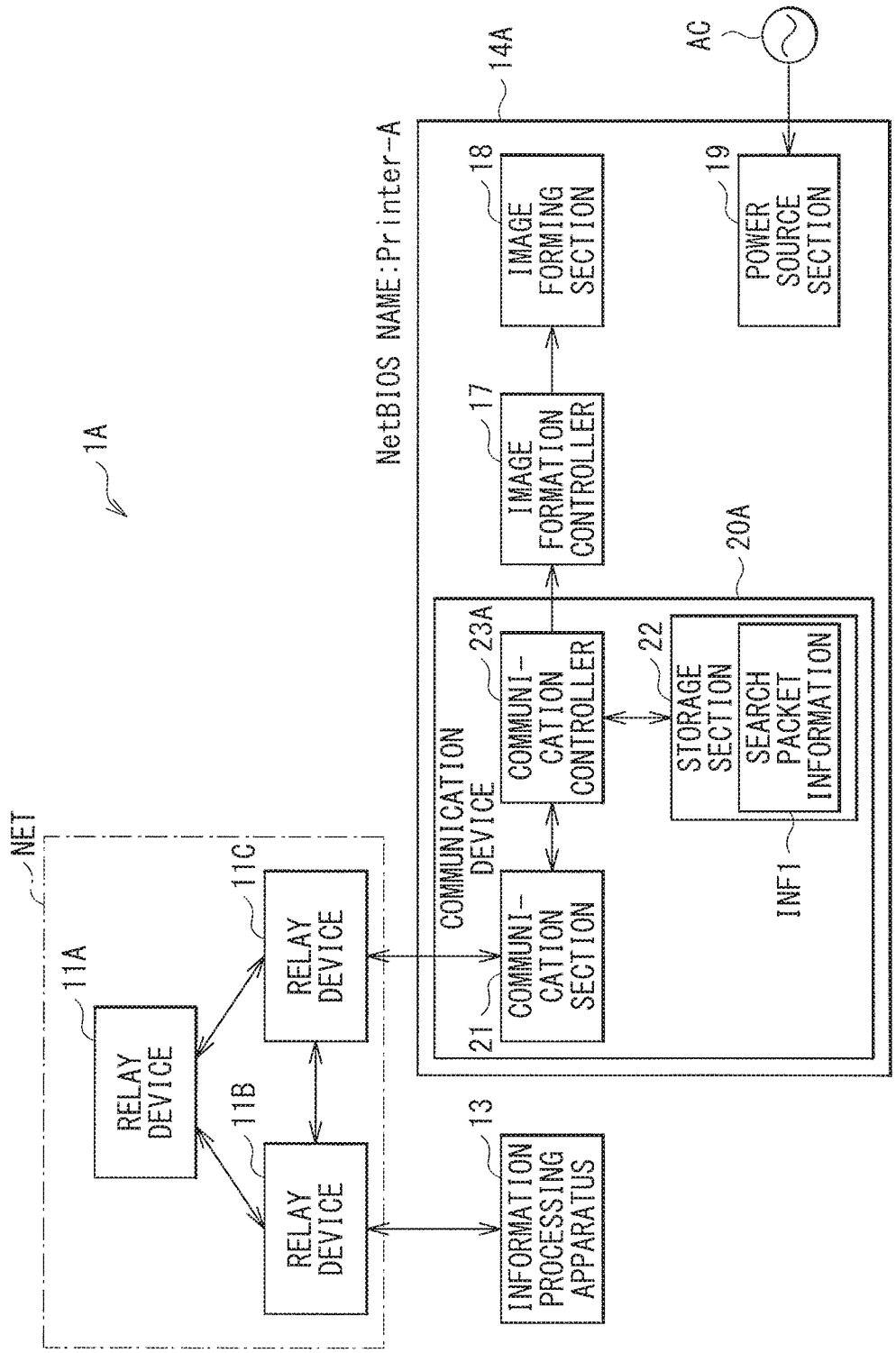
FIG. 4 is a block diagram illustrating an example of a configuration of a communication system according to a modification example of one example embodiment.

FIG. 4 illustrates an example of a configuration of a communication system 1A according to the modification example 1-1. The communication system 1A may include a plurality of relay devices 11, the information processing apparatus 13, and an image forming apparatus 14A. In this example, the communication system 1A may include the three relay devices 11A, 11B, and 11C. The image forming apparatus 14A may include a communication device 20A. The communication device 20A may include a communication controller 23A. The communication controller 23A may be configured to carry out communication with the use of an IP address set in advance. In other words, whereas the communication controller 23 according to the foregoing first example embodiment performs control of carrying out communication with the use of an IP address assigned by the DHCP server 12, the communication controller 23A according to the modification example 1-1 may perform control of carrying out communication with the use of an IP address set in advance. Furthermore, the communication controller 23A may perform control of causing the communication section 21 to transmit a plurality of search packets P intermittently in the communication cutoff period T on the basis of the search packet information INF1 stored in the storage section 22. Furthermore, in a case where the communication section 21 receives a network packet, the communication controller 23A may perform control of causing the communication section 21 to stop transmitting a search packet P and start the network communication.

Figure 5:
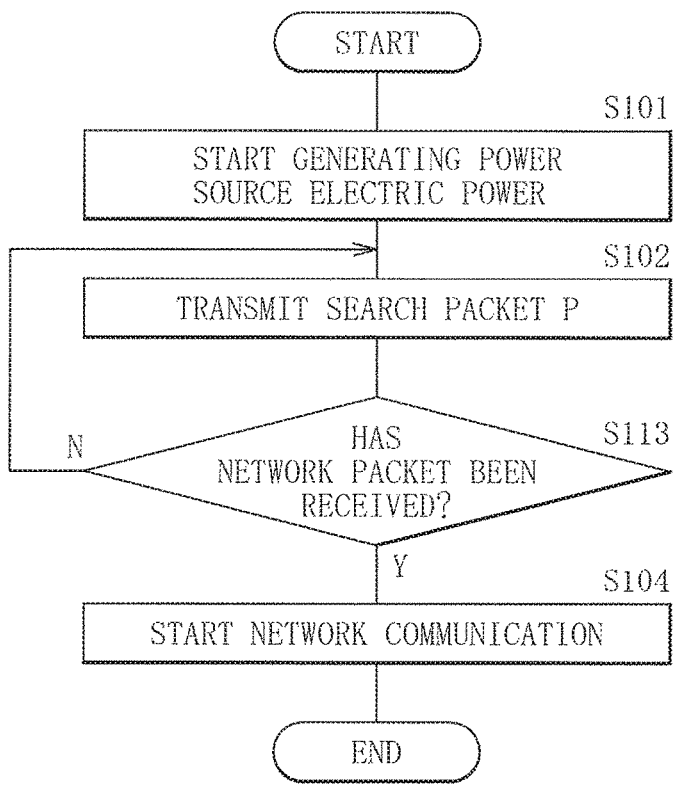
FIG. 5 is a flowchart illustrating an example of an operation of a communication device illustrated in FIG. 4.

FIG. 5 illustrates an example of an operation of the communication device 20A.

In step S101, when the user turns on the power source switch of the image forming apparatus 14A, the power source section 19 may start generating a power source electric power to be used in the communication device 20A, the image formation controller 17, and the image forming section 18 on the basis of an alternating-current electric power supplied from the alternating-current power source AC.

Thereafter, the communication device 20A may transmit a search packet P in step S 102.

Thereafter, in step S113, the communication device 20A may determine whether a network packet has been received. The network packet may be the search packet P transmitted in step S 102, may be a packet Q transmitted from the information processing apparatus 13, or may be a packet Q transmitted from an unillustrated network apparatus. The packet Q may be a unicast packet or a broadcast packet. In a case where the communication device 20A has not received any network packet ("N" in step S 113), the flow may return to step S 102, and steps S102 and S113 may be repeated until the communication device 20A receives a network packet.

In a case where the communication device 20A has received a network packet in step S113 ("Y" in step S113), the communication device 20A may start the network communication in step S104. In other words, in a case where the communication device 20A has received a network packet, the communication device 20A may determine that the communication cutoff period T has ended and start the network communication.

Thus, the flow may be terminated.

Figure 6:
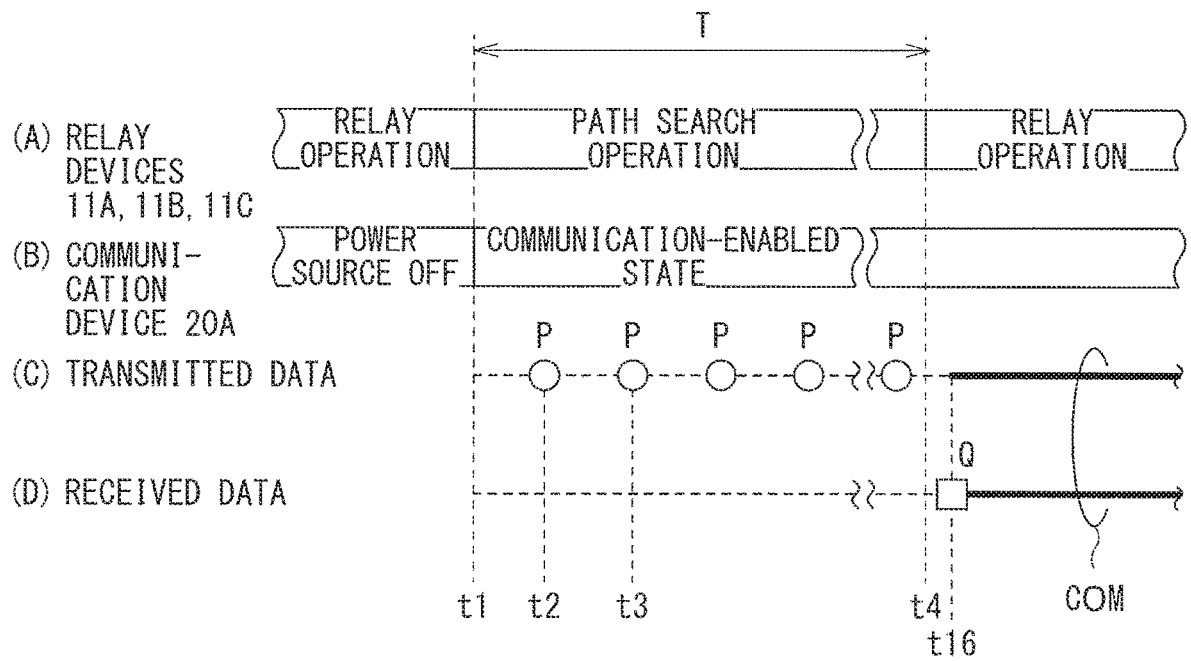
FIG. 6 is a timing chart illustrating an example of an operation of a communication system illustrated in FIG. 4.

FIG. 6 illustrates an example of an operation of the communication system 1A. In this example, as in the case of the foregoing first example embodiment illustrated in FIG. 3, the relay devices 11A, 11B, and 11C may end the path search operation at the timing t4, and the communication cutoff period T may end at the timing t4, as illustrated in Part (A) of FIG. 6.

At a timing t16 thereafter, the communication device 20A may receive a packet Q, as illustrated in Part (D) of FIG. 6. In a specific but non-limiting example, the information processing apparatus 13 may transmit this packet Q to the image forming apparatus 14A immediately after the timing t4, the network NET may relay this packet Q, and the communication device 20A of the image forming apparatus 14A may receive this packet Q at the timing t16. This may cause the communication device 20A to determine that the communication cutoff period T has ended, and the communication device 20A may start the network communication COM, as illustrated in Parts (C) and (D) of FIG. 6.

The communication controller 23A may correspond to a "controller" in one specific but non-limiting embodiment of the technology. The information processing apparatus 13 may correspond to a "network apparatus" in one specific but non-limiting embodiment of the technology. The packet Q may correspond to a "packet" in one specific but non-limiting embodiment of the technology.

Modification Example 1-2

In the foregoing first example embodiment, the communication device 20 may start the network communication in a case where the communication device 20 has received one of the search packets P that the communication device 20 has transmitted, but this is not a limiting example. For example, the communication device 20 may start the network communication after receiving two or more search packets P of the search packets P that the communication device 20 has transmitted.

Modification Example 1-3

In the foregoing first example embodiment, the communication device 20 may stop transmitting a search packet P in a case where the communication device 20 has received any of the search packets P that the communication device 20 has transmitted, but this is not a limiting example. For example, the communication device 20 may further transmit one or more search packets P after receiving any of the search packets P that the communication device 20 has transmitted.

2. Second Example Embodiment

Next, a communication system 2 according to a second example embodiment will be described. In the second example embodiment, a communication device may start transmitting a plurality of search packets P intermittently upon a lapse of a standby time after the communication device and the relay device 11C become electrically coupled to each other in the communication cutoff period T. Configurations that are substantially identical to those of the communication system 1 according to the first example embodiment described above may be given identical reference characters, and descriptions thereof will be omitted as appropriate.

Figure 7:
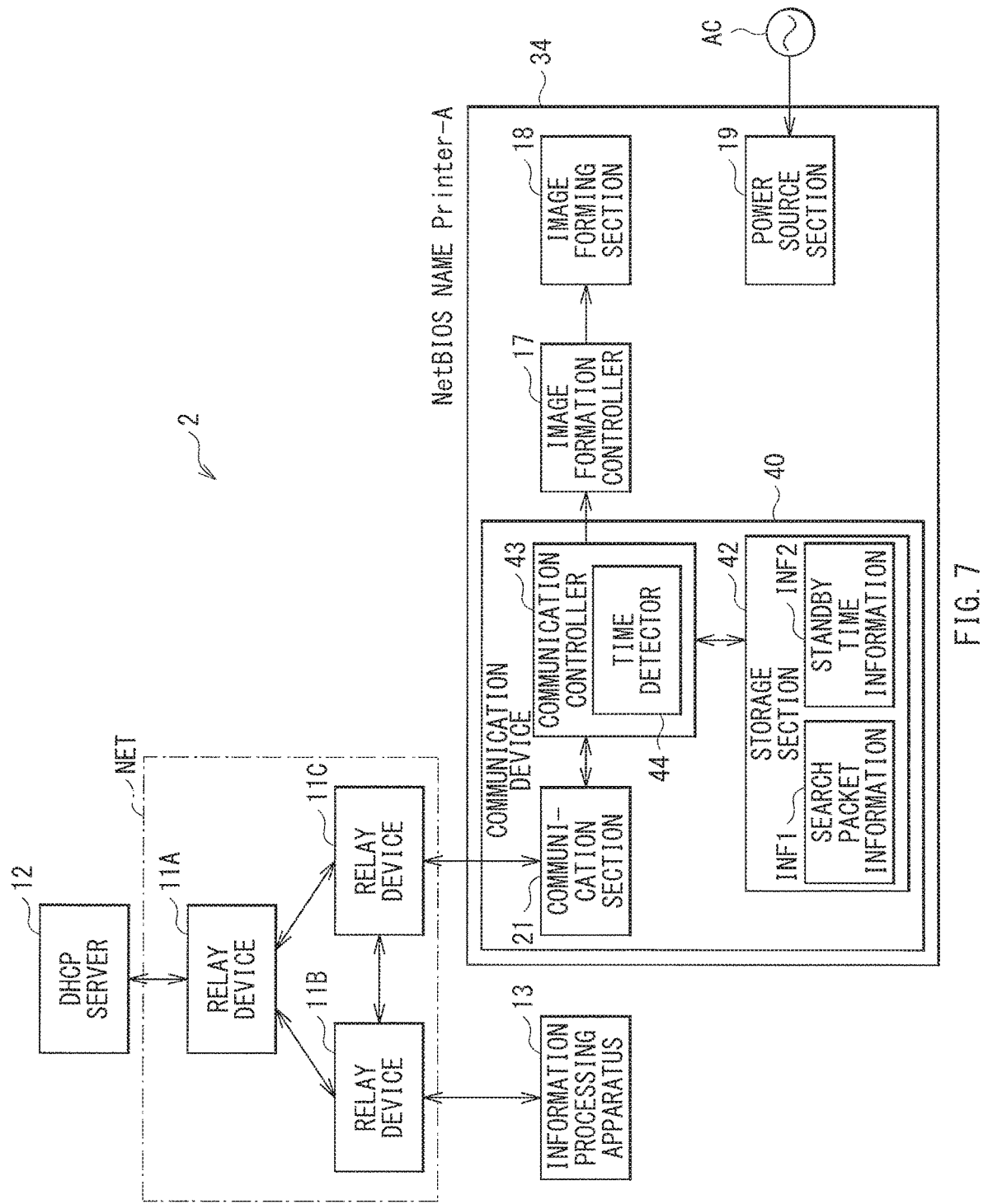
FIG. 7 is a block diagram illustrating an example of a configuration of a communication system according to one example embodiment.

FIG. 7 illustrates an example of a configuration of the communication system 2. The communication system 2 may include an image forming apparatus 34. The image forming apparatus 34 may include a communication device 40. The communication device 40 may include a storage section 42 and a communication controller 43.

The storage section 42 may hold the search packet information INF1 and standby time information INF2. The standby time information INF2 may include information on the length of the time, i.e., a standby time T2, from a time when the communication device 40 and the relay device 11C become electrically coupled to each other to a time when a plurality of search packets P starts being transmitted intermittently.

The communication controller 43 may be configured to control a communication operation of the communication device 40. The communication controller 43 may include a time detector 44. The time detector 44 may be configured to measure a receiving time T1 from a time when the communication device 40 and the relay device 11C become electrically coupled to each other to a time when a search packet P is received. Furthermore, the time detector 44 may calculate, on the basis of the detected receiving time T1, a standby time T2 to be used when the communication device 40 becomes electrically coupled to the relay device 11C the next time. The communication controller 43 may store information on the calculated standby time T2 into the storage section 42 as the standby time information INF2.

For example, the communication controller 43 may perform control of causing the communication section 21 to transmit a plurality of search packets P intermittently on the basis of the search packet information INF1 stored in the storage section 42 upon a lapse of the standby time T2 indicated by the standby time information INF2 stored in the storage section 42 after the communication device 40 and the relay device 11C become electrically coupled to each other. Furthermore, in a case where the communication section 21 receives any of the transmitted search packets P, the communication controller 43 may perform control of causing the communication section 21 to stop transmitting a search packet P and to start the network communication.

The communication controller 43 may correspond to a "controller" in one specific but non-limiting embodiment of the technology. The storage section 42 may correspond to a "storage section" in one specific but non-limiting embodiment of the technology.

Figure 8:
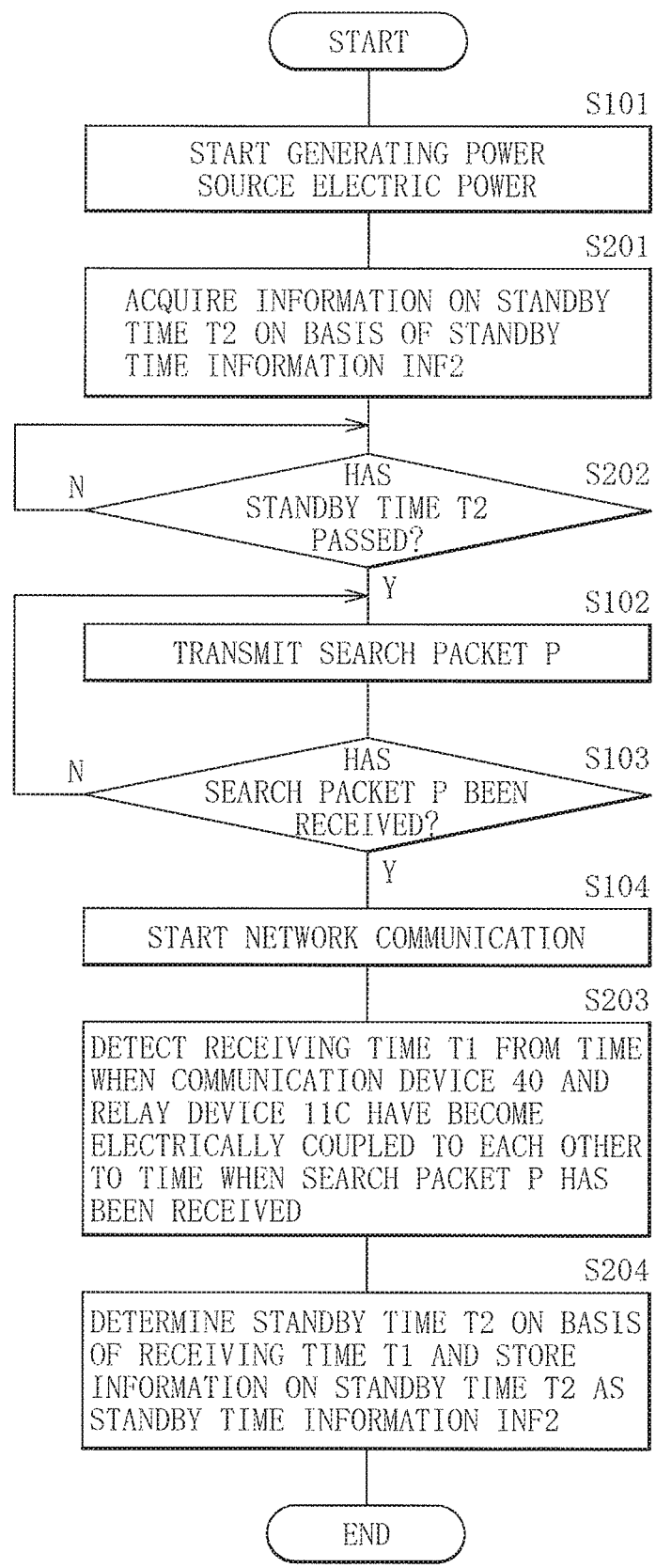
FIG. 8 is a flowchart illustrating an example of an operation of a communication device illustrated in FIG. 7.

FIG. 8 illustrates an example of an operation of the communication device 40 performed when the user turns on a power source switch of the image forming apparatus 34.

In step S101, when the user turns on the power source switch of the image forming apparatus 34, the power source section 19 may start generating a power source electric power to be used in the communication device 40, the image formation controller 17, and the image forming section 18 on the basis of an alternating-current electric power supplied from the alternating-current power source AC.

Thereafter, in step S201, the communication controller 43 of the communication device 40 may acquire the information on the standby time T2 on the basis of the standby time information INF2 stored in the storage section 42.

Thereafter, in step S202, the communication controller 43 of the communication device 40 may determine whether the standby time T2 has passed after the communication device 40 and the relay device 11C have become electrically coupled to each other. In a case where the standby time T2 has not passed yet ("N" in step S202), the communication controller 43 may repeat step S202 until the standby time T2 passes.

In a case where the standby time T2 has passed in step S202 ("Y" in step S202), the communication device 40 may transmit a search packet P in step S102. In a specific but non-limiting example, the communication controller 43 may generate a search packet P on the basis of the search packet information INF1 stored in the storage section 42, and the communication section 21 may transmit the generated search packet P through broadcasting.

Thereafter, in step S103, the communication controller 43 of the communication device 40 may determine whether the communication section 21 has received the search packet P transmitted in step S 102. In a case where the communication section 21 has not received the search packet P ("N" in step S 103), the flow may return to step S 102, and steps S102 and S103 may be repeated until the communication device 40 receives a search packet P.

In a case where the communication section 21 has received the search packet P in step S103 ("Y" in step S103), the communication device 40 may start the network communication in step S 104. In other words, in a case where the communication device 40 has received the search packet P, the communication device 40 may determine that the communication cutoff period T has ended and start the network communication.

Thereafter, in step S203, the time detector 44 of the communication device 40 may detect the receiving time T1 from a time when the communication device 40 and the relay device 11C have become electrically coupled to each other to a time when the search packet P has been received.

Thereafter, in step S204, the time detector 44 may calculate, on the basis of the receiving time T1 detected in step S203, the standby time T2 to be used when the communication device 40 becomes electrically coupled to the relay device 11C the next time, and the communication controller 43 may store information on the calculated standby time T2 into the storage section 42 as the standby time information INF2.

Thus, the flow may be terminated.

Figure 9:
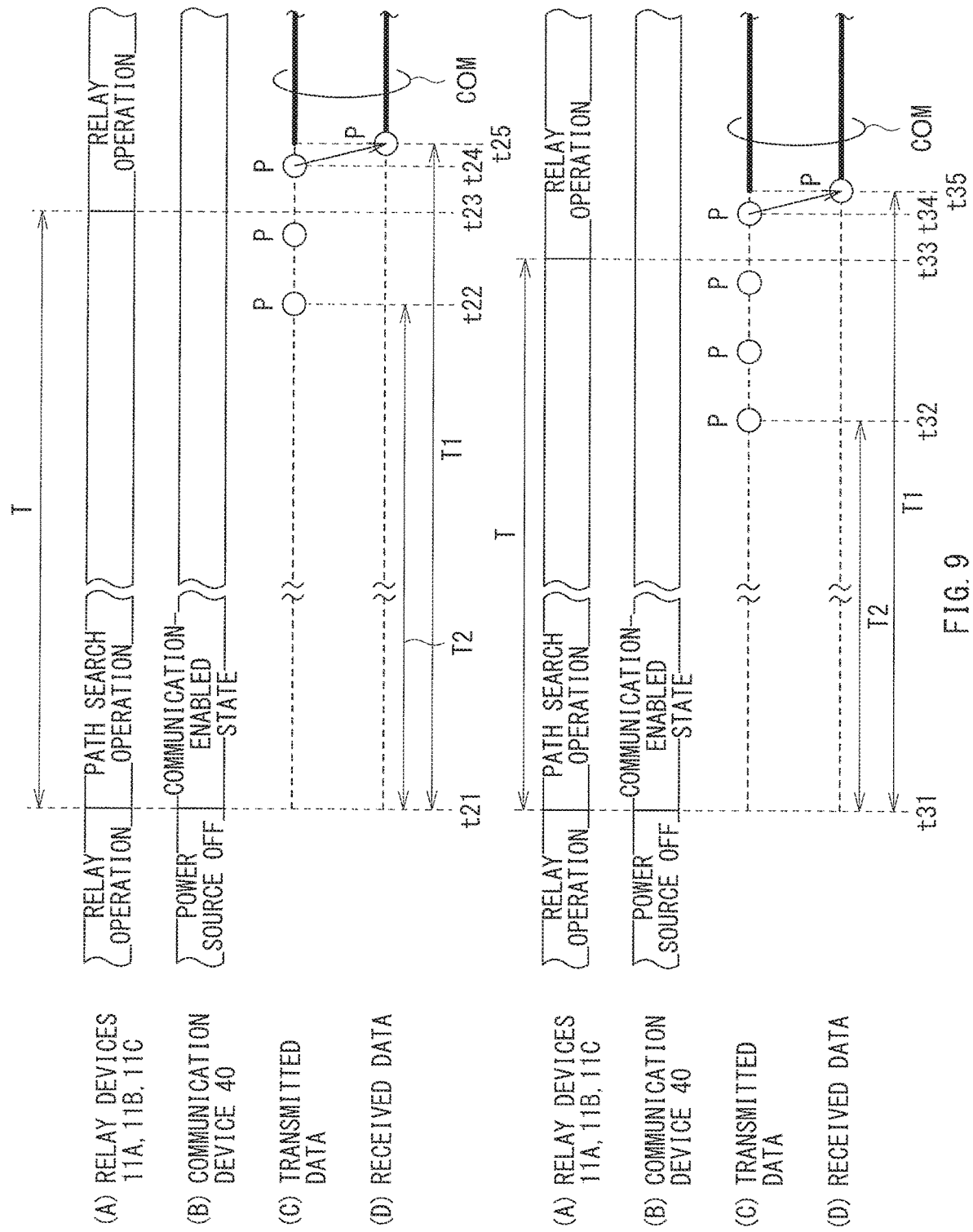
FIG. 9 is a timing chart illustrating an example of an operation of a communication system illustrated in FIG. 7.

FIG. 9 illustrates an example of an operation of the communication system 2. Parts (A) and (E) illustrate an operation of the relay devices 11A, 11B, and 11C. Parts (B) and (F) illustrate an operation of the communication device 40. Parts (C) and (G) illustrate data transmitted by the communication device 40. Parts (D) and (H) illustrate data received by the communication device 40. Parts (A) to (D) illustrate an operation performed when the user turns on the power source switch of the image forming apparatus 34. Parts (E) to (H) illustrate an operation performed when the user turns on the power source switch of the image forming apparatus 34 the next time.

In the example illustrated in Parts (A) to (D) of FIG. 9, the user may turn on the power source switch of the image forming apparatus 34 at a timing t21. This may cause the power source electric power generated by the power source section 19 to be supplied to the communication device 40, and the communication device 40 may start operating and enter the communication-enabled state, as illustrated in Part (B) of FIG. 9. When this causes the communication device 40 and the relay device 11C to become electrically coupled to each other, the relay devices 11A, 11B, and 11C may perform the path search operation with the use of the spanning tree protocol, as illustrated in Part (A) of FIG. 9. In this manner, the communication cutoff period T may start.

The communication controller 43 may acquire the information on the standby time T2 on the basis of the standby time information INF2 stored in the storage section 42. Thereafter, the communication device 40 may transmit a first search packet P at a timing t22 at which the standby time T2 has passed after the communication device 40 and the relay device 11C have become electrically coupled to each other, as illustrated in Part (C) of FIG. 9. In this example, the communication device 40 may transmit a plurality of search packets P intermittently thereafter.

At a timing t23, the relay devices 11A, 11B, and 11C may end the path search operation, as illustrated in Part (A) of FIG. 9, and the communication cutoff period T may end. The relay devices 11A, 11B, and 11C may resume the operation of relaying the network communication. At a timing t24 thereafter, the communication device 40 may transmit a search packet P, as illustrated in Part (C) of FIG. 9, and the communication device 40 may receive this search packet P at a timing t25, as illustrated in Part (D) of FIG. 9. This may cause the communication device 40 to determine that the communication cutoff period T has ended, and the communication device 40 may start the network communication COM, as illustrated in Parts (C) and (D) of FIG. 9.

The time detector 44 may detect the receiving time T1 from a time when the communication device 40 and the relay device 11C have become electrically coupled to each other to a time when the search packet P has been received, i.e., from the timing t21 to the timing t25. Thereafter, the time detector 44 may calculate, on the basis of the detected receiving time T1, the standby time T2 to be used when the communication device 40 becomes electrically coupled to the relay device 11C the next time. In a specific but non-limiting example, the time detector 44 may calculate the standby time T2 to make the standby time T2 shorter than the receiving time T1. Thereafter, the communication controller 43 may store the information on the calculated standby time T2 into the storage section 42 as the standby time information INF2.

Thereafter, the user may turn off the power source switch of the image forming apparatus 34 after some time has passed, for example.

Thereafter, as illustrated in Parts (E) to (H) of FIG. 9, at a timing t31, the user may again turn on the power source switch of the image forming apparatus 34. This may cause the power source electric power generated by the power source section 19 to be supplied to the communication device 40, and the communication device 40 may start operating and enter the communication-enabled state, as illustrated in Part (F) of FIG. 9. When this causes the communication device 40 and the relay device 11C to become electrically coupled to each other, the relay devices 11A, 11B, and 11C may perform the path search operation with the use of the spanning tree protocol, as illustrated in Part (E) of FIG. 9. In this manner, the communication cutoff period T may start.

The communication controller 43 may acquire the information on the standby time T2 on the basis of the standby time information INF2 stored in the storage section 42. Thereafter, the communication device 40 may transmit a first search packet P at a timing t32 at which the standby time T2 has passed after the communication device 40 and the relay device 11C have become electrically coupled to each other, as illustrated in Part (G) of FIG. 9. In this example, the communication device 40 may transmit a plurality of search packets P intermittently thereafter.

At a timing t33, the relay devices 11A, 11B, and 11C may end the path search operation, as illustrated in Part (E) of FIG. 9, and the communication cutoff period T may end. The relay devices 11A, 11B, and 11C may resume the operation of relaying the network communication. In other words, the path search operation may end in a shorter time in this example than in the previous operation illustrated in Parts (A) to (D) of FIG. 9. At a timing t34 thereafter, the communication device 40 may transmit a search packet P, as illustrated in Part (G) of FIG. 9, and the communication device 40 may receive this search packet P at a timing t35, as illustrated in Part (H) of FIG. 9. This may cause the communication device 40 to determine that the communication cutoff period T has ended, and the communication device 40 may start the network communication COM, as illustrated in Parts (G) and (H) of FIG. 9.

Thereafter, the time detector 44 may detect the receiving time T1 from a time when the communication device 40 and the relay device 11C have become electrically coupled to each other to a time when the search packet P has been received, i.e., from the timing t31 to the timing t35. Furthermore, the time detector 44 may calculate, on the basis of the detected receiving time T1, the standby time T2 to be used when the communication device 40 becomes electrically coupled to the relay device 11C the next time. Thereafter, the communication controller 43 may store the information on the calculated standby time T2 into the storage section 42 as the standby time information INF2.

Figure 10:
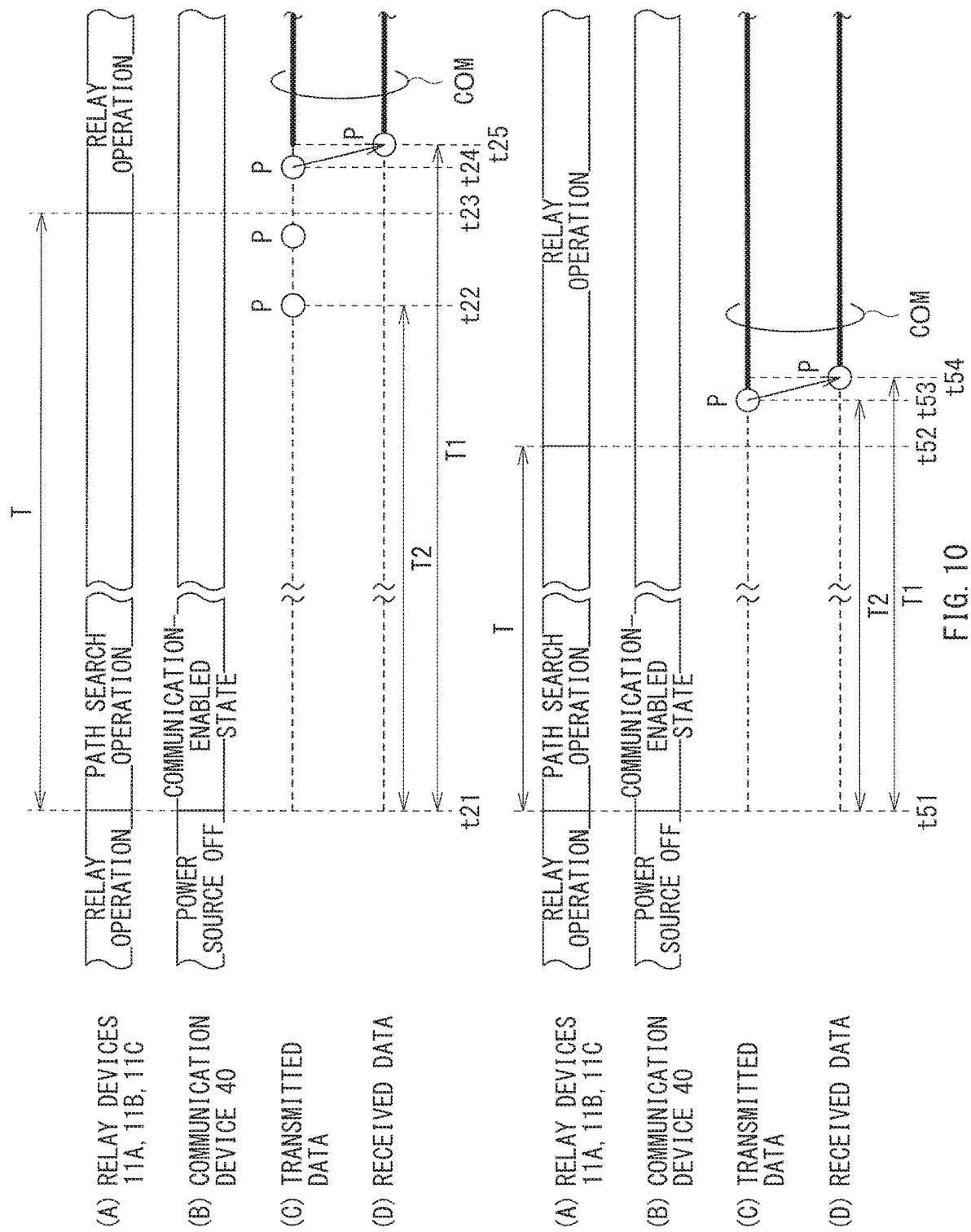
FIG. 10 is a timing chart illustrating another example of the operation of the communication system illustrated in FIG. 7.

FIG. 10 illustrates another example of the operation of the communication system 2. Parts (A) to (D) of FIG. 10 are the same as Parts (A) to (D) of FIG. 9.

In the example illustrated in Parts (E) to (H) of FIG. 10, the relay devices 11A, 11B, and 11C may perform the path search operation with the use of the spanning tree protocol during a period from a timing t51 to a timing t52, as illustrated in Part (E) of FIG. 10. The path search operation may end in a shorter time in this example than in the case illustrated in Parts (E) to (H) of FIG. 9.

The communication device 40 may transmit a first search packet P at a timing t53 at which the standby time T2 has passed after the communication device 40 and the relay device 11C have become electrically coupled to each other, as illustrated in Part (G) of FIG. 10. Thereafter, the communication device 40 may receive this search packet P at a timing t54, as illustrated in Part (H) of FIG. 10. This may cause the communication device 40 to determine that the communication cutoff period T has ended, and the communication device 40 may start the network communication COM, as illustrated in Parts (G) and (H) of FIG. 10.

Thereafter, the time detector 44 may detect the receiving time T1 from a time when the communication device 40 and the relay device 11C have become electrically coupled to each other to a time when the search packet P has been received, i.e., from the timing t51 to the timing t54. Furthermore, the time detector 44 may calculate, on the basis of the detected receiving time T1, the standby time T2 to be used when the communication device 40 becomes electrically coupled to the relay device 11C the next time. Thereafter, the communication controller 43 may store the information on the calculated standby time T2 into the storage section 42 as the standby time information INF2.

In this manner, the communication device 40 may start transmitting a plurality of search packets P upon a lapse of the standby time T2 after the communication device 40 and the relay device 11C have become electrically coupled to each other. This allows an unnecessary search packet P to be kept from being transmitted, and it is therefore possible to reduce the load on the communication device 40.

Furthermore, the communication device 40 may detect the receiving time T1 from a time when the communication device 40 and the relay device 11C have become electrically coupled to each other to a time when the search packet P has been received and calculate, on the basis of the detected receiving time T1, the standby time T2 to be used when the communication device 40 becomes electrically coupled to the relay device 11C the next time. This allows the communication device 40 to obtain the standby time T2 corresponding to the length of the communication cutoff period T in the communication system 2. Therefore, it is possible to appropriately set the timing of starting the network communication, as compared with the case where a fixed predetermined time is set for the standby time T2, for example.

In a specific but non-limiting example, the communication device 40 may calculate the standby time T2 to make the standby time T2 shorter than the receiving time T1. This makes it possible to reduce the time leading up to the start of the network communication in a case where the duration for which the path search operation is performed is decreased as the configuration of the network is changed as illustrated in FIG. 9, for example, and where the length of the communication cutoff period T is decreased. In other words, in a case where a fixed standby time T2 is used, for example, in a case where the duration for which the path search operation is performed is decreased as the configuration of the network is changed, for example, the time from a time when the path search operation has ended to a time when a first search packet P is transmitted may be wasted. In contrast, the communication device 40 may calculate the standby time T2 to make the standby time T2 shorter than the receiving time T1. This makes it possible to start transmitting a plurality of search packets P before the path search operation ends, as illustrated in FIG. 9, for example. As a result, it is possible to reduce the time leading up to the start of the network communication from the end of the communication cutoff period T in the communication device 40.

As described thus far, in the second example embodiment, a plurality of search packets may start being transmitted upon a lapse of the standby time after the communication device and the relay device have become electrically coupled to each other. This allows an unnecessary search packet to be kept from being transmitted, and it is therefore possible to reduce the load on the communication device.

In the second example embodiment, the receiving time from a time when the communication device and the relay device have become electrically coupled to each other to a time when the search packet has been received may be detected and, on the basis of the detected receiving time, the standby time to be used when the communication device becomes electrically coupled to the relay device 11C the next time may be calculated. This makes it possible to obtain the standby time corresponding to the length of the communication cutoff period in the communication system, and it is therefore possible to appropriately set the timing for starting the network communication.

In the present example embodiment, the standby time may be calculated to make the standby time shorter than the receiving time, and it is therefore possible to reduce the time leading up to the start of the network communication.

Other effects may be similar to those in the first example embodiment described above.

Modification Example 2-1

Each modification example of the first example embodiment described above may be applied to the communication device 40 according to the foregoing second example embodiment.

3. Third Example Embodiment

Next, a communication system 101 according to a third example embodiment will be described. Configurations that are substantially identical to those of the communication system 1 according to the first example embodiment described above may be given identical reference characters, and descriptions thereof will be omitted as appropriate.

Figure 11:
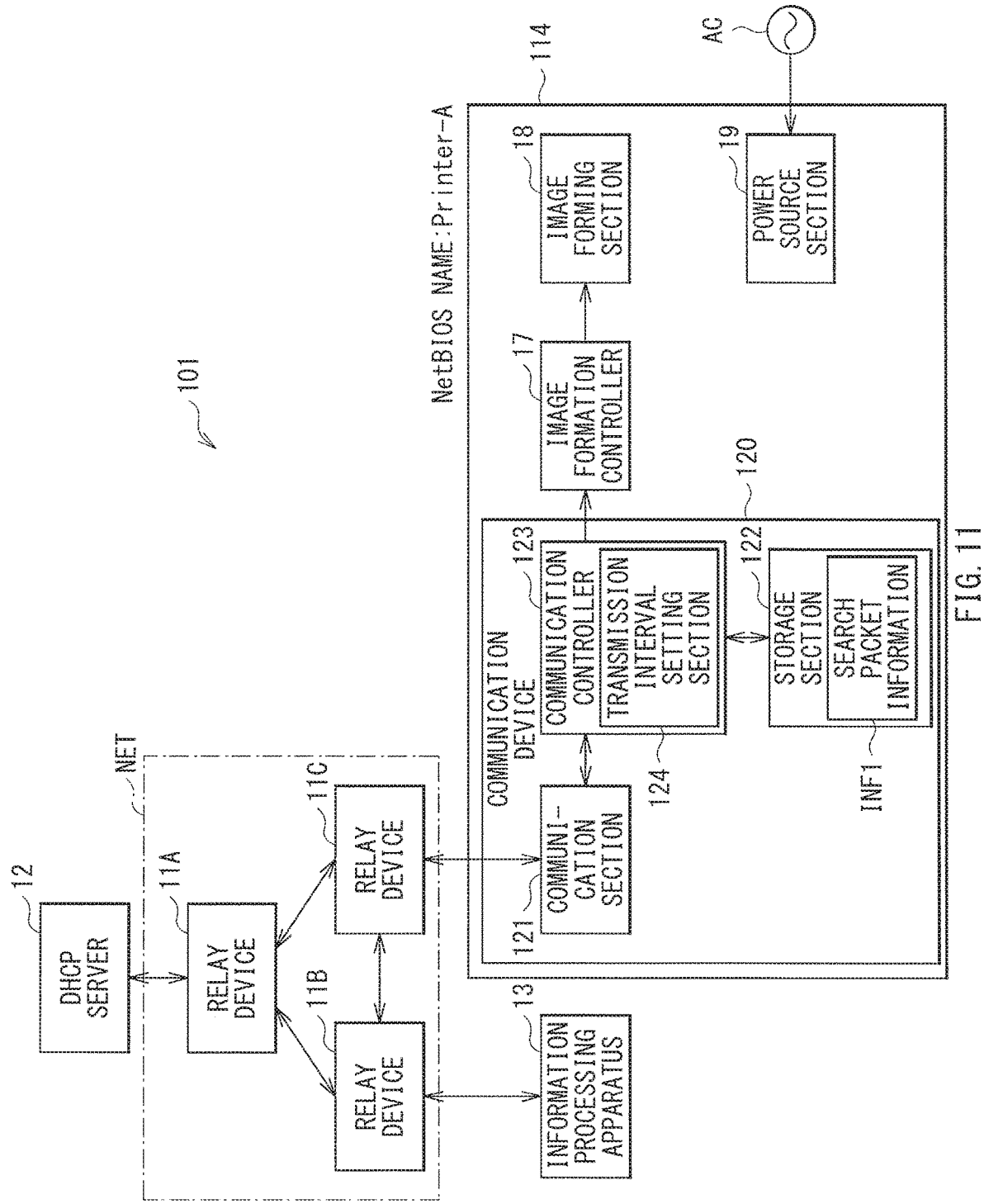
FIG. 11 is a block diagram illustrating an example of a configuration of a communication system according to one example embodiment.

FIG. 11 illustrates an example of a configuration of the communication system 101. The communication system 101 may include an image forming apparatus 114. The image forming apparatus 114 may include a communication device 120. The communication device 120 may include a communication section 121, a storage section 122, and a communication controller 123.

The communication section 121 may be configured to communicate with the DHCP server 12 and the information processing apparatus 13 by transmitting and/or receiving a network packet via the network NET.

Furthermore, as will be described later, in a case where the relay devices 11A, 11B, and 11C are performing the path search operation and have cut off communication with devices other than the relay devices 11A, 11B, and 11C, the communication section 121 may transmit a plurality of search packets P intermittently to search for the image forming apparatus 114 which includes the communication section 121, and also transmit a plurality of DHCP request packets R1 intermittently to request the DHCP server 12 to assign an IP address. In this example, a search packet P may be a network packet of a "NetBIOS Name Service" format. In this search packet P, the "Queries" parameter may be set to "Printer-A," which is the NetBIOS name of the image forming apparatus 114 including the communication section 121. The communication section 121 may transmit the search packet P through broadcasting with the use of UDP Port 137. Furthermore, the communication section 121 may transmit a DHCP request packet R1 through unicasting with the use of UDP Port 68.

In this example, a network packet of a "NetBIOS Name Service" format may be applied to a search packet P, but this is not a limiting example. For example, a network packet used in the "WSD" protocol or a network packet used in the "multicast DNS" protocol may also be applied to a search packet P.

The storage section 122 may be a nonvolatile memory. The storage section 122 may hold the search packet information INF1. The search packet information INF1 may include information on a search packet P to be transmitted by the communication section 121.

The communication controller 123 may be configured to control a communication operation of the communication device 120. The communication controller 123 may include, for example but not limited to, a processor and a RAM. The communication controller 123 may include a transmission interval setting section 124. The transmission interval setting section 124 may be configured to set a transmission interval of a search packet P and a transmission interval of a DHCP request packet R1.

In a case where the relay devices 11A, 11B, and 11C have started the path search operation and have cut off communication with devices other than the relay devices 11A, 11B, and 11C, the communication controller 123 may perform control of causing the communication section 121 to transmit a plurality of search packets P intermittently on the basis of the search packet information INF1 stored in the storage section 122 and also perform control of causing the communication section 121 to transmit a plurality of DHCP request packets R1 intermittently. At this point, the transmission interval setting section 124 may set the transmission interval of the search packets P and the transmission interval of the DHCP request packets R1 to a time interval T11, e.g., three seconds. The time interval T11 may be equivalent to a typical transmission interval of a search packet P and may be shorter than a typical transmission interval of a DHCP request packet R1.

In a case where the communication section 121 receives any of the transmitted search packets P, the communication controller 123 may perform control of causing the communication section 121 to stop transmitting a search packet P and to start the network communication. Furthermore, the transmission interval setting section 124 may set the transmission interval of the DHCP request packet R1 to a time interval T12, e.g., 10 seconds, which is longer than the time interval T11. The time interval T12 may be equivalent to a typical transmission interval of a DHCP request packet R1.

In a case where the communication section 121 receives a DHCP response packet R2 transmitted from the DHCP server 12 and including information on an assigned IP address, the communication controller 123 may perform control of causing the communication section 121 to stop transmitting a DHCP request packet R1. Furthermore, the communication controller 123 may acquire the assigned IP address on the basis of the received DHCP response packet R2 and perform network setting in accordance with the acquired IP address. Furthermore, the communication controller 123 may perform control of causing the communication section 121 to communicate with a network apparatus with the use of the acquired IP address. For example, in a case where the communication section 121 has received print data transmitted from the information processing apparatus 13 by communicating with the information processing apparatus 13 with the use of the acquired IP address, the communication controller 123 may supply the received print data to the image formation controller 17.

With this configuration, in the communication system 101, the communication device 120 may transmit a plurality of search packets P intermittently at the time interval T11 and transmit a plurality of DHCP request packets R1 intermittently at the time interval T11 during a period, i.e., the communication cutoff period T, in which the relay devices 11A, 11B, and 11C are performing the path search operation and have cut off communication with devices other than the relay devices 11A, 11B, and 11C. In a case where the communication device 120 has received any of the transmitted search packets P, the communication device 120 may determine that the communication cutoff period T has ended. Therefore, the communication device 120 may stop transmitting a search packet P and start communicating with a network apparatus. At this point, the communication device 120 may set the transmission interval of the DHCP request packet R1 to the time interval T12, which is longer than the time interval T11. Furthermore, in a case where the communication device 120 has received a DHCP response packet R2, the communication device 120 may stop transmitting a DHCP request packet R1, acquire the assigned IP address on the basis of the received DHCP response packet R2, and perform network setting on the basis of the acquired IP address. This makes it possible to reduce the time leading up to the start of the network communication in which the assigned IP address is used in the communication system 101.

The DHCP request packet R1 may correspond to a "request packet" in one specific but non-limiting embodiment of the technology. The DHCP response packet R2 may correspond to a "response packet" in one specific but non-limiting embodiment of the technology. The time interval T11 may correspond to a "first time interval" in one specific but non-limiting embodiment of the technology. The time interval T12 may correspond to a "second time interval" in one specific but non-limiting embodiment of the technology.

Figure 12:
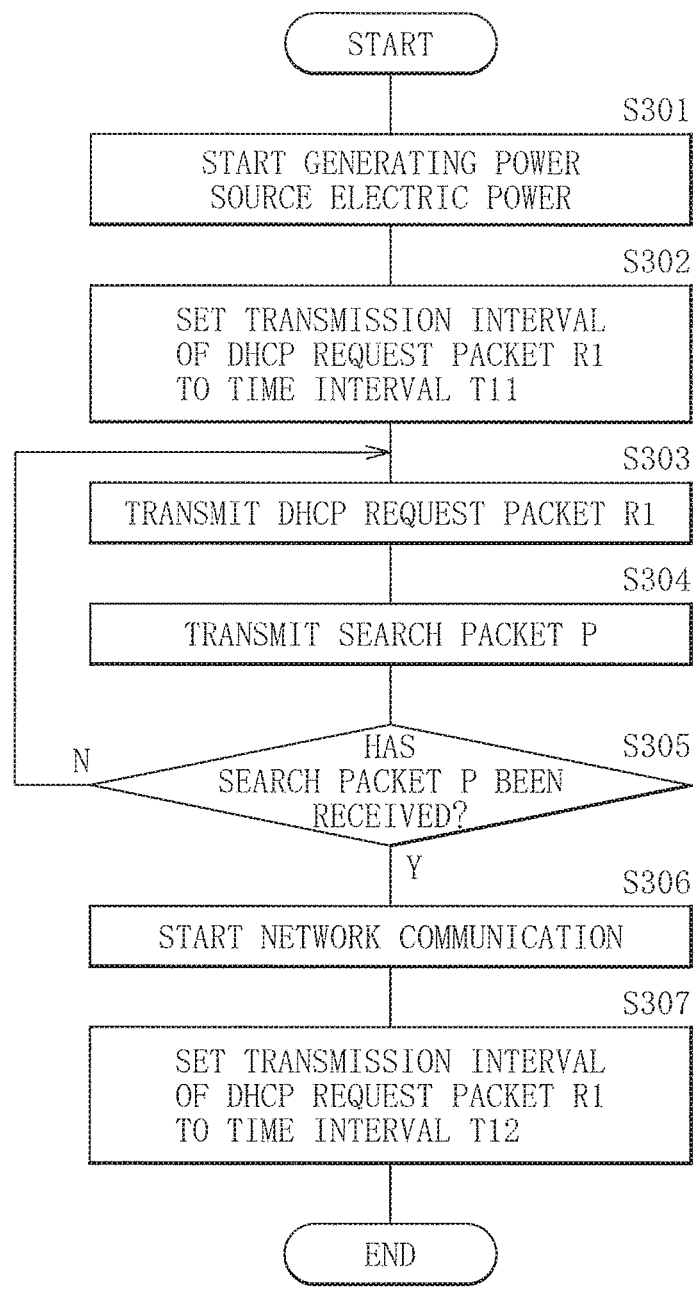
FIG. 12 is a flowchart illustrating an example of an operation of a communication device illustrated in FIG. 11.
Figure 13:
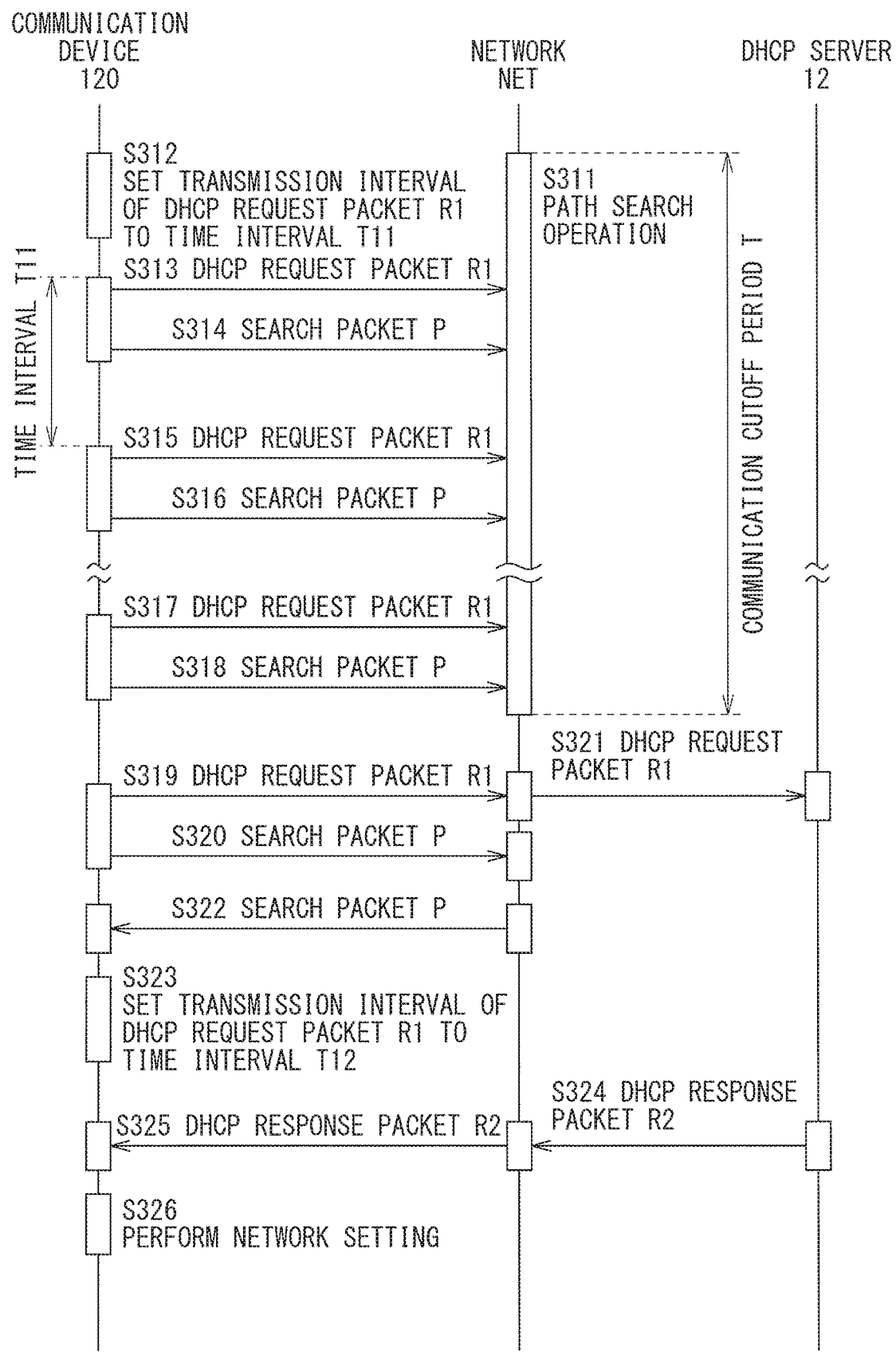
FIG. 13 is a sequence diagram illustrating an example of an operation of a communication system illustrated in FIG. 11.

FIG. 12 illustrates an example of an operation of the communication device 120 performed when the user turns on the power source switch of the image forming apparatus 114. FIG. 13 illustrates an example of an operation of the communication system 101.

First, in step S301, when the user turns on the power source switch of the image forming apparatus 114, the power source section 19 may start generating a power source electric power to be used in the communication device 120, the image formation controller 17, and the image forming section 18 on the basis of an alternating-current electric power supplied from the alternating-current power source AC. This may cause the power source electric power generated by the power source section 19 to be supplied to the communication device 120, the communication device 120 may start operating, and the image forming apparatus 114 may become electrically coupled to the relay device 11C.

In the example illustrated in FIG. 13, when the relay device 11C detects electrical coupling between the relay device 11C and the image forming apparatus 114, the relay devices 11A, 11B, and 11C, i.e., the network NET, may perform the path search operation with the use of the spanning tree protocol in step S311. The relay devices 11A, 11B, and 11C may cut off communication with devices other than the relay devices 11A, 11B, and 11C. In this manner, the communication cutoff period T may start.

Thereafter, in step S302 and in step S312, the transmission interval setting section 124 of the communication device 120 may set the transmission interval of the DHCP request packet R1 to the time interval T11, e.g., three seconds. Furthermore, the transmission interval setting section 124 may set the transmission interval of the search packet P to the time interval T11.

Thereafter, the communication device 120 may transmit a DHCP request packet R1 in step S303. In a specific but non-limiting example, the communication controller 123 may generate a DHCP request packet R1 whose destination is set to the DHCP server 12, and the communication section 121 may transmit this DHCP request packet R1 through unicasting.

Thereafter, the communication device 120 may transmit a search packet P in step S304. In a specific but non-limiting example, the communication controller 123 may generate a search packet P on the basis of the search packet information INF1 stored in the storage section 122, and the communication section 121 may transmit the generated search packet P through broadcasting.

Thereafter, in step S305, the communication controller 123 of the communication device 120 may determine whether the communication section 121 has received the search packet P transmitted in step S304. In a case where the communication section 121 has not received the search packet P ("N" in step S305), the flow may return to step S303, and steps S303 to S305 may be repeated until the communication device 120 receives a search packet P.

In the example illustrated in FIG. 13, first, the communication device 120 may transmit a first DHCP request packet R1 and a first search packet P sequentially in steps S313 and S314, respectively. The DHCP request packet R1 and the search packet P may be lost since the relay devices 11A, 11B, and 11C, i.e., the network NET, have cut off communication with devices other than the relay devices 11A, 11B, and 11C. Hence, the communication device 120 may not receive the search packet P, and therefore, in steps S315 and S316, the communication device 120 may transmit, respectively, a next DHCP request packet R1 and a next search packet P sequentially after a time corresponding to the time interval T11 has passed. In this manner, in this example, the communication device 120 may transmit a plurality of DHCP request packets R1 and a plurality of search packets P intermittently at the time interval T11.

In a case where the communication section 121 has received the search packet P in step S305 ("Y" in step S305), the communication device 120 may start the network communication in step S306. In other words, in a case where the communication section 121 has received the search packet P, the communication device 120 may determine that the communication cutoff period T has ended and start the network communication.

Thereafter, in step S307, the transmission interval setting section 124 of the communication device 120 may set the transmission interval of the DHCP request packet R1 to the time interval T12, e.g., 10 seconds, which is longer than the time interval T11. In other words, the transmission interval setting section 124 may restore the transmission interval of the DHCP request packet R1 to the time interval T12, which is a typical transmission interval, because the communication cutoff period T has ended.

In the example illustrated in FIG. 13, when the relay devices 11A, 11B, and 11C, i.e., the network NET, have ended the path search operation in step S311, the relay devices 11A, 11B, and 11C may cancel the cutoff of the communication with devices other than the relay devices 11A, 11B, and 11C, and the communication cutoff period T may end. Thereafter, the relay devices 11A, 11B, and 11C may resume the operation of relaying the network communication. On the basis of the processing result of the path search operation, the relay devices 11A, 11B, and 11C may so control the communication as to keep a network packet from being transmitted in a loop. Thereafter, the communication device 120 may transmit a DHCP request packet R1 and a search packet P sequentially in steps S319 and S320, respectively. The DHCP request packet R1 transmitted in step S319 may be unicast to the DHCP server 12, and therefore, the relay devices 11A, 11B, and 11C, i.e., the network NET, may transmit this DHCP request packet R1 to the DHCP server 12 in step S321. Furthermore, the search packet P transmitted in step S320 may serve to search for the apparatus including the communication device 120 and be broadcast, and thus the relay devices 11A, 11B, and 11C, i.e., the network NET, may transmit this search packet P to the communication device 120 in step S322. In response to receiving this search packet P, the communication device 120 may determine that the communication cutoff period T has ended. Thereafter, the communication device 120 may set the transmission interval of the DHCP request packet R1 to the time interval T12 in step S323.

The DHCP server 12 may assign an IP address to the communication device 120 on the basis of the DHCP request packet R1 received in step S321 and transmit a DHCP response packet R2 including information on the assigned IP address in step S324. The relay devices 11A, 11B, and 11C, i.e., the network NET, may transmit this DHCP response packet R2 to the communication device 120 in step S325. The communication device 120 may receive this DHCP response packet R2 and perform network setting on the basis of the information on the assigned IP address included in the received DHCP response packet R2 in step S326. Thereafter, the communication device 120 may be able to carry out the network communication with the use of the assigned IP address. For example, the communication device 120 may receive print data transmitted from the information processing apparatus 13 by communicating with the information processing apparatus 13 via the relay devices 11A, 11B, and 11C, i.e., the network NET. Thereafter, the image forming apparatus 114 may form an image on a recording medium, such as paper, on the basis of the received print data.

Thus, the flow may be terminated. An example of the operation of the communication system 101 will be described below in detail with some specific but non-limiting examples.

Figure 14:
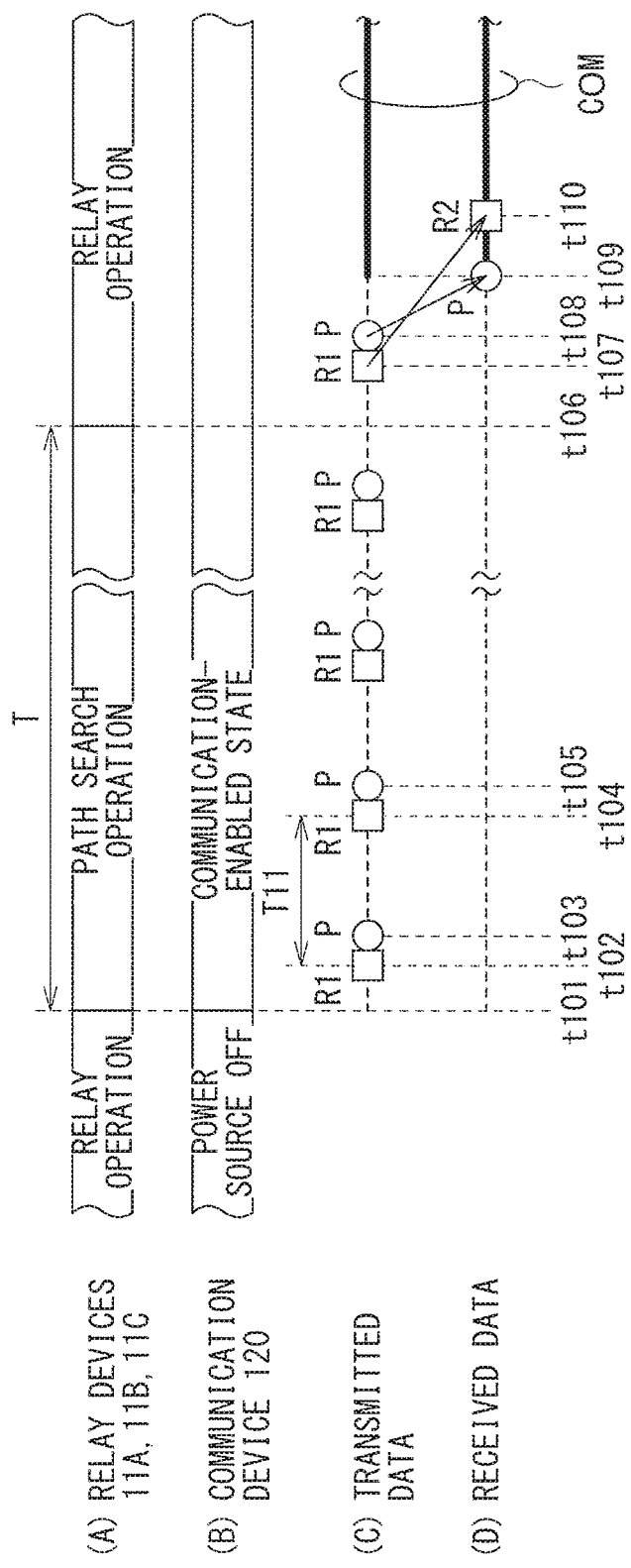
FIG. 14 is a timing chart illustrating an example of an operation of the communication system illustrated in FIG. 11.

FIG. 14 illustrates an example of an operation of the communication system 101. Part (A) illustrates an operation of the relay devices 11A, 11B, and 11C, i.e., the network NET. Part (B) illustrates an operation of the communication device 120. Part (C) illustrates data transmitted by the communication device 120. Part (D) illustrates data received by the communication device 120.

The relay devices 11A, 11B, and 11C, i.e., the network NET, may be performing the operation of relaying the network communication during a period preceding a timing t101, as illustrated in Part (A) of FIG. 14. Furthermore, the power source switch of the image forming apparatus 114 may be in an off state during this period, and therefore, no power source electric power may be supplied to the communication device 120, as illustrated in Part (B) of FIG. 14. At the timing t101, the user may turn on the power source switch of the image forming apparatus 114. This may cause the power source electric power generated by the power source section 19 to be supplied to the communication device 120, and the communication device 120 may start operating and enter the communication-enabled state, as illustrated in Part (B) of FIG. 14. In this manner, the communication cutoff period T may start.

The communication device 120 may set the transmission interval of the DHCP request packet R1 to the time interval T11, e.g., three seconds. Thereafter, at a timing t102 and a timing t103, the communication device 120 may transmit, respectively, a first DHCP request packet R1 and a first search packet P sequentially, as illustrated in Part (C) of FIG. 14. Thereafter, the communication device 120 may transmit a DHCP request packet R1 and a search packet P intermittently at the time interval T11.

At a timing t106, the relay devices 11A, 11B, and 11C may end the path search operation, as illustrated in Part (A) of FIG. 14, and the communication cutoff period T may end. The relay devices 11A, 11B, and 11C may resume the operation of relaying the network communication.

At a timing t107 and a timing t108 thereafter, the communication device 120 may respectively transmit a DHCP request packet R1 and a search packet P sequentially, as illustrated in Part (C) of FIG. 14. The communication device 120 may receive the transmitted search packet P at a timing t109, as illustrated in Part (D) of FIG. 14. This may cause the communication device 120 to determine that the communication cutoff period T has ended, and the communication device 120 may start the network communication COM, as illustrated in Parts (C) and (D) of FIG. 14. Furthermore, the communication device 120 may set the transmission interval of the DHCP request packet R1 to the time interval T12, e.g., 10 seconds.

Thereafter, at a timing t110, the communication device 120 may receive a DHCP response packet R2 transmitted from the DHCP server 12 in response to the DHCP request packet R1 transmitted at the timing t107, as illustrated in Part (D) of FIG. 14. The communication device 120 may perform network setting on the basis of the information on the assigned IP address included in the received DHCP response packet R2.

In this manner, the communication device 120 may start transmitting search packets P and DHCP request packets R1 intermittently in a case where the image forming apparatus 114 becomes electrically coupled to the relay device 11C. This allows the communication device 120 to receive a DHCP response packet R2 promptly after the communication cutoff period T has ended and therefore to perform network setting promptly on the basis of the assigned IP address. Therefore, it is possible to reduce the time leading up to the start of the network communication in which the assigned IP address is used.

In other words, in a case where the communication device transmits only a search packet P intermittently and transmits a DHCP request packet R1 after receiving a search packet P, the time from a time when the search packet P has been received to a time when the DHCP response packet R2 is received may increase. This may delay the timing at which network setting is performed on the basis of the assigned IP address. As a result, there is a possibility that the time from a time when the communication cutoff period T has ended to a time when the network communication is started with the use of the assigned IP address increases.

In contrast, the communication device 120 may start transmitting a search packet P and a DHCP request packet R1 intermittently in a case where the image forming apparatus 114 has become electrically coupled to the relay device 11C. Therefore, as illustrated in FIG. 14, it is possible to reduce the time from a time when the search packet P has been received to a time when the DHCP response packet R2 is received, i.e., from the timing t109 to the timing t110. This makes it possible to perform network setting promptly on the basis of the assigned IP address. As a result, in the communication device 120, it is possible to reduce the time leading up to the start of the network communication in which the assigned IP address used from the end of the communication cutoff period T.

Furthermore, in the communication device 120, in a case where a search packet P has been received, the transmission interval of the DHCP request packet R1 may be set to the time interval T12, which is longer than the time interval T11. This makes it possible to reduce a possibility that an unnecessary DHCP request packet R1 is transmitted beyond the relay device 11C.

In other words, for example, in a case where the communication device does not change the transmission interval of the DHCP request packet R1, in FIG. 14, the communication device may transmit a DHCP request packet R1 at a timing (hereinafter, referred to as a timing tA) at which the time corresponding to the time interval T11, e.g., three seconds, has passed after the DHCP request packet R1 has been transmitted at the timing t107. In other words, in a case where the communication device fails to receive, by the timing tA, a DHCP response packet R2 in response to the DHCP request packet R1 transmitted at the timing t107, the communication device may again transmit a DHCP request packet R1 at the timing tA. In this case, the communication device may transmit two DHCP request packets R1 after the communication cutoff period T has ended, and therefore, an unnecessary DHCP request packet R1 may be transmitted beyond the relay device 11C.

In contrast, in the communication device 120, in a case where a search packet P has been received, the transmission interval of the DHCP request packet R1 may be set to the time interval T12, which is longer than the time interval T11.

Thereby, in the communication device 120, as illustrated in FIG. 14, the communication device 120 may transmit a DHCP request packet R1 at a timing (hereinafter referred to as a timing tB) at which the time corresponding to the time interval T12, e.g., 10 seconds, has passed after the DHCP request packet R1 has been transmitted at the timing t107. In other words, in a case where the communication device 120 fails to receive, by the timing tB, a DHCP response packet R2 in response to the DHCP request packet R1 transmitted at the timing t107, the communication device 120 may again transmit a DHCP request packet R1 at the timing tB. However, since the time interval T12 is longer than the time interval T11, the communication device 120 may be able to receive a DHCP response packet R2 by the timing tB. In this case, the communication device 120 may stop transmitting a DHCP request packet R1 thereafter, and thus the communication device 120 may refrain from transmitting a DHCP request packet R1 at the timing tB. In other words, the communication device 120 may transmit one DHCP request packet R1 after the communication cutoff period T has ended. As a result, it is possible reduce a possibility that an unnecessary DHCP request packet R1 is transmitted beyond the relay device 11C in the communication device 120.

Figure 15:
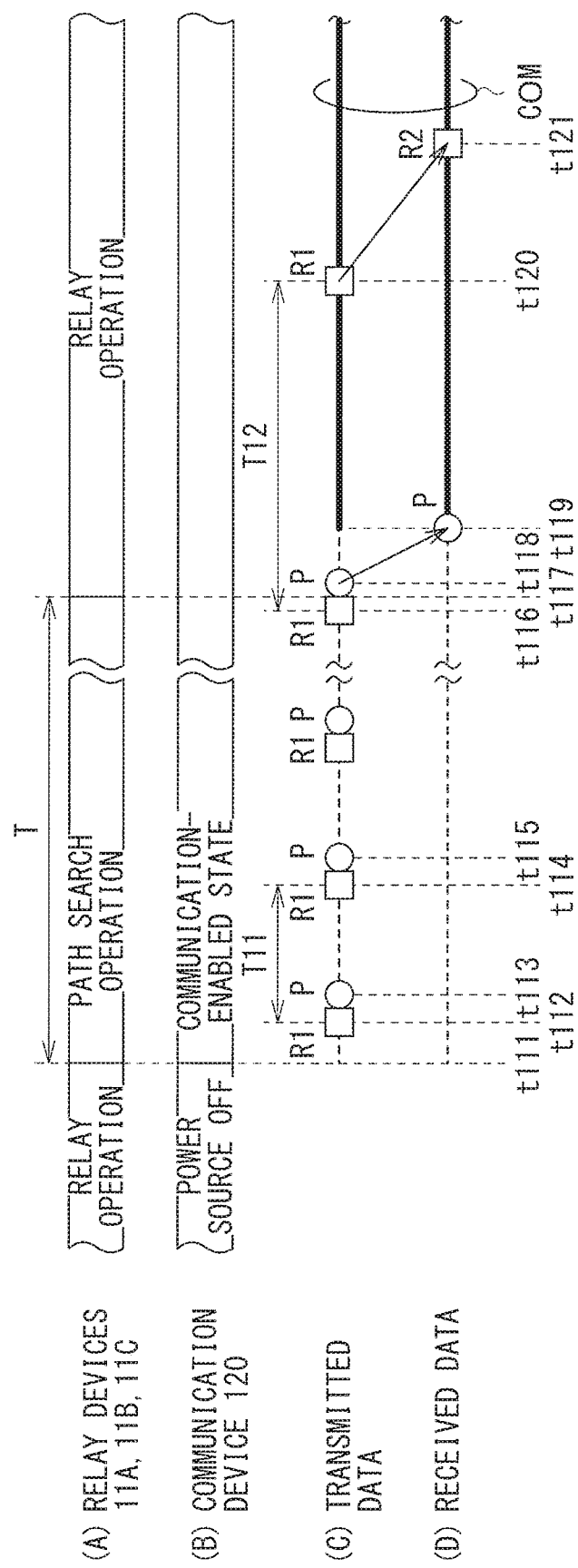
FIG. 15 is a timing chart illustrating another example of the operation of the communication system illustrated in FIG. 11.

FIG. 15 illustrates another example of the operation of the communication system 101. This example may differ from the example illustrated in FIG. 14 in terms of the timing at which the communication cutoff period T ends.

At a timing t111, the communication cutoff period T may start, and the communication device 120 may set the transmission interval of the DHCP request packet R1 to the time interval T11, e.g., three seconds. Thereafter, at a timing t112 and a timing t113, the communication device 120 may respectively transmit a first DHCP request packet R1 and a first search packet P sequentially, as illustrated in Part (C) of FIG. 15. Thereafter, the communication device 120 may transmit a DHCP request packet R1 and a search packet P intermittently at the time interval T11. Thereafter, at a timing t117, the relay devices 11A, 11B, and 11C may end the path search operation, as illustrated in Part (A) of FIG. 15, and the communication cutoff period T may end. The relay devices 11A, 11B, and 11C may resume the operation of relaying the network communication.

In this example, at a timing t116 and a timing t118, the communication device 120 may respectively transmit a DHCP request packet R1 and a search packet P sequentially, as illustrated in Part (C) of FIG. 15. The timing t116 may precede the timing t117 at which the relay devices 11A, 11B, and 11C end the path search operation. Therefore, at the timing t116, the DHCP request packet R1 may be lost since the relay devices 11A, 11B, and 11C, i.e., the network NET, have cut off communication with devices other than the relay devices 11A, 11B, and 11C. In contrast, the timing t118 may come after the timing t117 at which the relay devices 11A, 11B, and 11C end the path search operation. Therefore, at the timing t118, the search packet P may be transmitted to the communication device 120 since the relay devices 11A, 11B, and 11C have resumed the operation of relaying the network communication.

The communication device 120 may receive this search packet P at a timing t119, as illustrated in Part (D) of FIG. 15. This may cause the communication device 120 to determine that the communication cutoff period T has ended, and the communication device 120 may start the network communication COM, as illustrated in Parts (C) and (D) of FIG. 15. Furthermore, the communication device 120 may set the transmission interval of the DHCP request packet R1 to the time interval T12, e.g., 10 seconds.

Thereafter, the communication device 120 may transmit a DHCP request packet R1 at a timing t120 at which the time corresponding to the time interval T12 has passed from the timing t116, as illustrated in Part (C) of FIG. 15.

Thereafter, at a timing t121, the communication device 120 may receive a DHCP response packet R2 transmitted from the DHCP server 12 in response to the DHCP request packet R1 transmitted at the timing t120, as illustrated in Part (D) of FIG. 15. The communication device 120 may perform network setting on the basis of the information on the assigned IP address included in the received DHCP response packet R2.

In this manner, in the communication device 120, a DHCP request packet R1 may be transmitted again even in a case where the timing at which the communication cutoff period T ends, i.e., the timing t117, falls between the timing at which a DHCP request packet R1 is transmitted, i.e., the timing t116, and the timing at which a search packet P is transmitted, i.e., the timing t118. Therefore, the communication device 120 may be able to receive a DHCP response packet R2. Accordingly, the communication device 120 may perform network setting on the basis of the assigned IP address.

As described above, in the third example embodiment, a search packet and a DHCP request packet may start being transmitted intermittently in a case where the image forming apparatus has become electrically coupled to the relay device. This makes it possible to receive a DHCP request packet promptly, and it is therefore possible to reduce the time leading up to the start of the network communication in which the assigned IP address is used.

In the third example embodiment, in a case where a search packet has been received, the transmission interval of the DHCP request packet may be set to the time interval T12, which is longer than the time interval T11. This makes it possible to reduce a possibility that an unnecessary DHCP request packet is transmitted beyond the relay device 11C.

Modification Example 3-11

In the foregoing third example embodiment, a DHCP request packet R1 may be transmitted immediately before a search packet P is transmitted, but this is not a limiting example. Alternatively, a DHCP request packet R1 may be transmitted immediately after a search packet P has been transmitted. This modification example 3-1 will be described below in detail.

As with the communication system 101 according to the foregoing third example embodiment illustrated in FIG. 11, a communication system 101A according to the modification example 3-1 may include an image forming apparatus 114A. The image forming apparatus 114A may include a communication device 120A. The communication device 120A may include a communication controller 123A. In a case where the relay devices 11A, 11B, and 11C have started the path search operation and have cut off communication with devices other than the relay devices 11A, 11B, and 11C, the communication controller 123A may perform control of causing the communication section 121 to transmit a plurality of search packets P intermittently and also perform control of causing the communication section 121 to transmit a plurality of DHCP request packets R1 intermittently. At this point, the communication section 121 may transmit a search packet P and a DHCP request packet R1 sequentially in this order.

Figure 16:
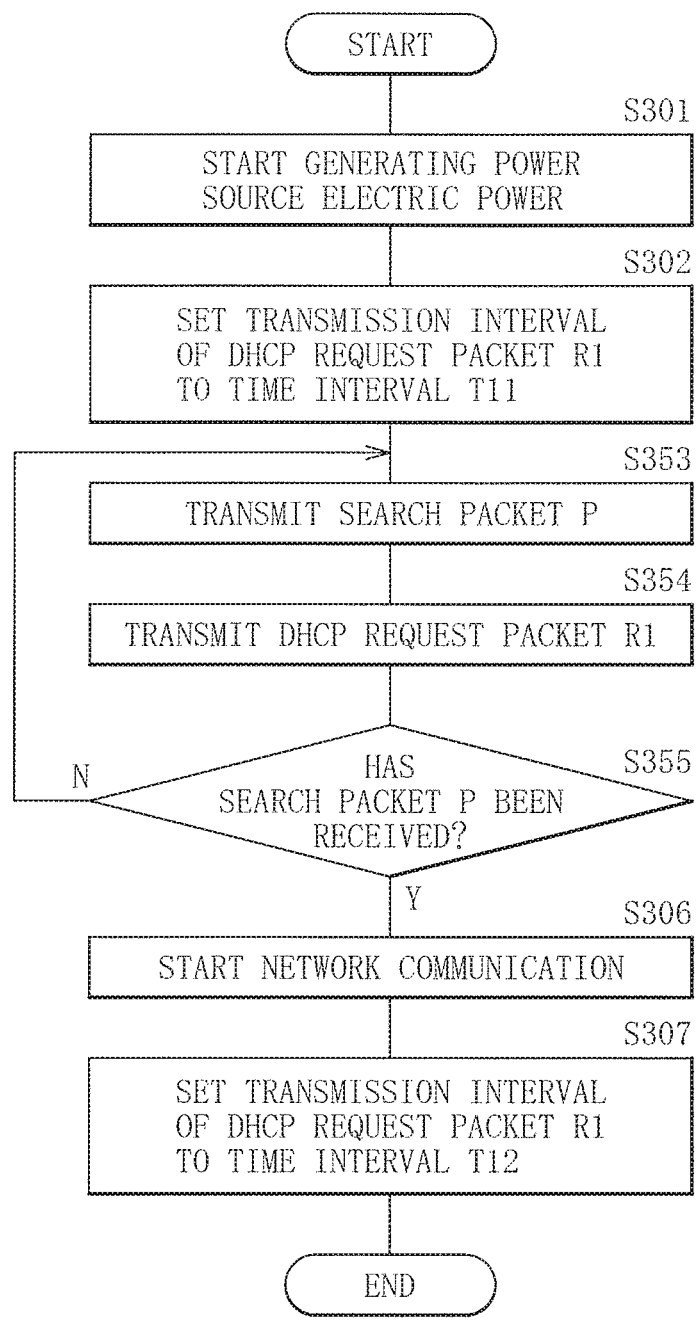
FIG. 16 is a flowchart illustrating an example of an operation of a communication device according to a modification example of one example embodiment.

FIG. 16 illustrates an example of an operation of the communication device 120A performed when the user turns on the power source switch of the image forming apparatus 114A. With regard to an operation of the communication device 120A, the operation in steps S303 to S305 of the communication device 120 according to the foregoing third example embodiment illustrated in FIG. 12 is changed.

After the transmission interval of the DHCP request packet R1 is set to the time interval T11 in step S302, the communication device 120A may transmit a search packet P in step S353. In a specific but non-limiting example, the communication controller 123A may generate a search packet P on the basis of the search packet information INF1 stored in the storage section 122, and the communication section 121 may transmit the generated search packet P through broadcasting.

Thereafter, the communication device 120A may transmit a DHCP request packet R1 in step S354. In a specific but non-limiting example, the communication controller 123A may generate a DHCP request packet R1 whose destination is set to the DHCP server 12, and the communication section 121 may transmit the generated DHCP request packet R1 through unicasting.

Thereafter, as in the case of the foregoing third example embodiment, the communication device 120A may determine whether the communication section 121 has received the search packet P in step S355. In a case where the communication section 121 has not received the search packet P ("N" in step S355), the flow may return to step S353, and steps S353 to S355 may be repeated until the communication device 120A receives a search packet P.

Figure 17:
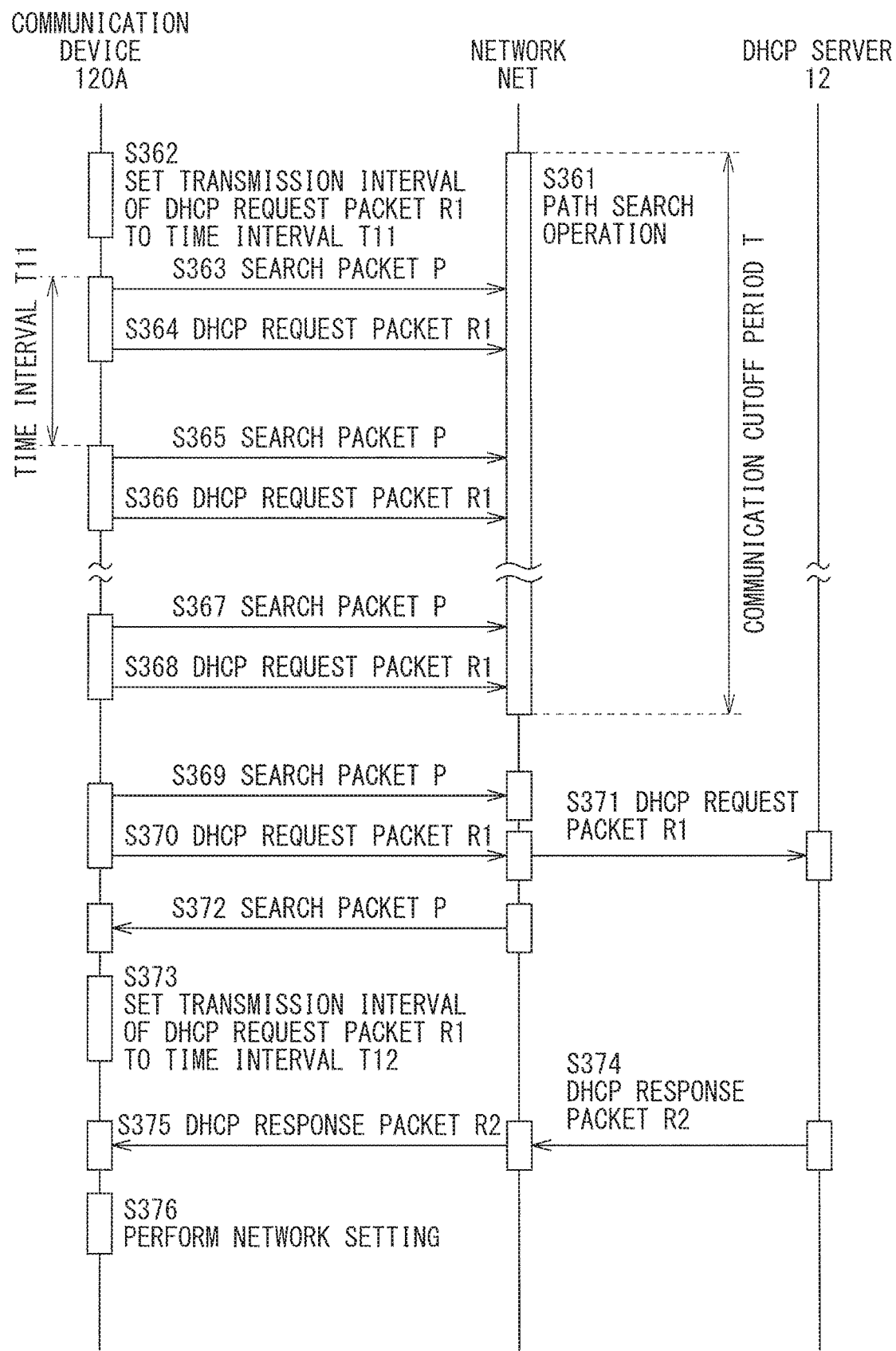
FIG. 17 is a sequence diagram illustrating an example of an operation of the communication system according to the modification example of one example embodiment.

FIG. 17 illustrates an example of an operation of the communication system 101A.

First, when the user turns on the power source switch of the image forming apparatus 114A, the communication device 120A may start operating, and the image forming apparatus 114A may become electrically coupled to the relay device 11C. When the relay device 11C detects electrical coupling between the relay device 11C and the image forming apparatus 114A, the relay devices 11A, 11B, and 11C, i.e., the network NET, may perform the path search operation with the use of the spanning tree protocol in step S361. In this manner, the communication cutoff period T may start.

The communication device 120A may set the transmission interval of the DHCP request packet R1 to the time interval T11, e.g., three seconds, in step S362.

Thereafter, the communication device 120A may transmit a first search packet P and a first DHCP request packet R1 sequentially in steps S363 and S364, respectively. The DHCP request packet R1 and the search packet P may be lost since the relay devices 11A, 11B, and 11C, i.e., the network NET, have cut off communication with devices other than the relay devices 11A, 11B, and 11C. Hence, the communication device 120A may not receive the search packet P, and therefore, in steps S365 and S366, the communication device 120A may respectively transmit a next search packet P and a next DHCP request packet R1 sequentially after the time corresponding to the time interval T11 has passed. In this manner, in this example, the communication device 120A may transmit a plurality of search packets P and a plurality of DHCP request packets R1 intermittently at the time interval T11.

Thereafter, the relay devices 11A, 11B, and 11C, i.e., the network NET, may end the path search operation in step S361. This may cause the relay devices 11A, 11B, and 11C to cancel the cutoff of communication with devices other than the relay devices 11A, 11B, and 11C, and the communication cutoff period T may end. Thereafter, the relay devices 11A, 11B, and 11C may resume the operation of relaying the network communication.

Thereafter, the communication device 120A may transmit a search packet P and a DHCP request packet R1 sequentially in steps S369 and S370, respectively. The DHCP request packet R1 transmitted in step S370 may be unicast to the DHCP server 12. Therefore, the relay devices 11A, 11B, and 11C, i.e., the network NET, may transmit this DHCP request packet R1 to the DHCP server 12 in step S371. Furthermore, the search packet P transmitted in step S369 may serve to search for the apparatus including the communication device 120A and be broadcast. Therefore, the relay devices 11A, 11B, and 11C, i.e., the network NET, may transmit this search packet P to the communication device 120A in step S372. In response to receiving this search packet P, the communication device 120A may determine that the communication cutoff period T has ended. Thereafter, the communication device 120A may set the transmission interval of the DHCP request packet R1 to the time interval T12 in step S373.

The DHCP server 12 may assign an IP address to the communication device 120A on the basis of the DHCP request packet R1 received in step S371 and transmit a DHCP response packet R2 including the information on the assigned IP address in step S374. The relay devices 11A, 11B, and 11C, i.e., the network NET, may transmit this DHCP response packet R2 to the communication device 120A in step S375. The communication device 120A may receive this DHCP response packet R2 and perform network setting on the basis of the information on the assigned IP address included in the received DHCP response packet R2 in step S376. Thereafter, the communication device 120A may be able to carry out the network communication with the use of the assigned IP address.

Figure 18:
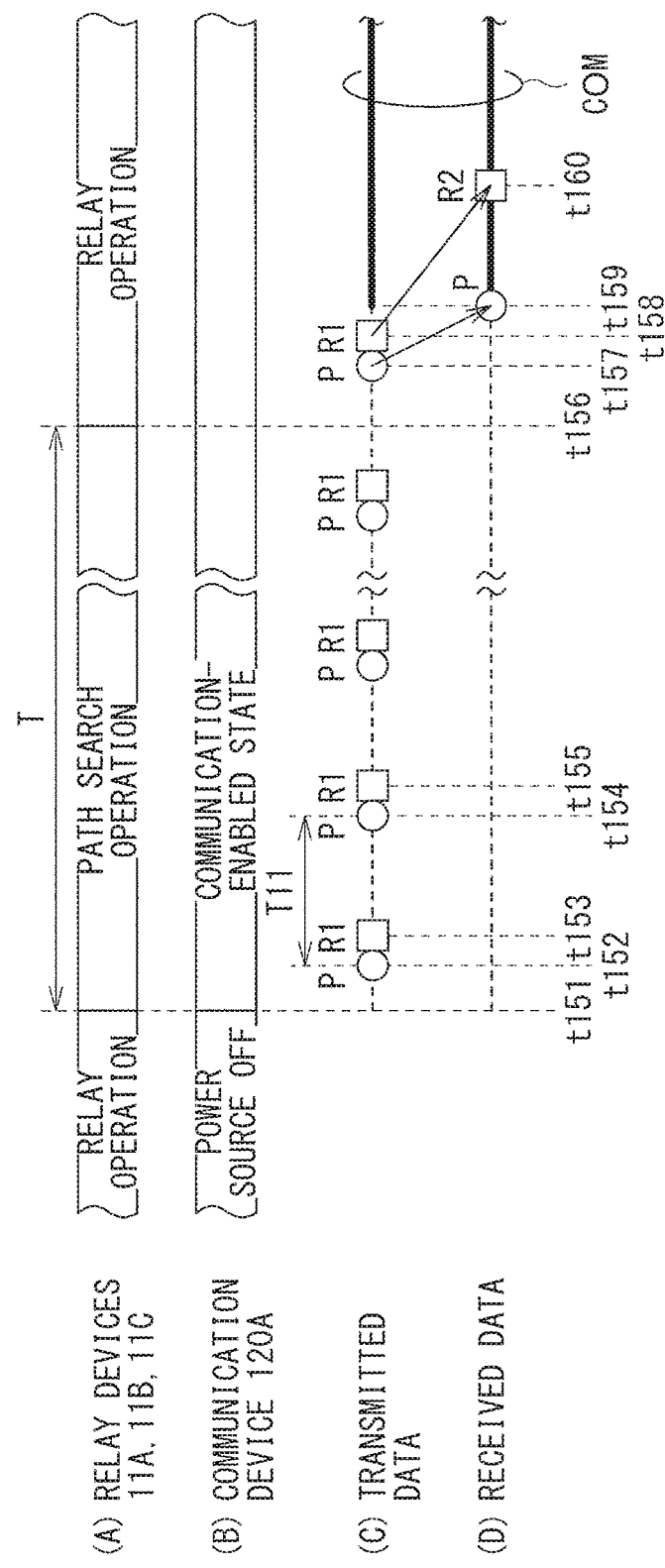
FIG. 18 is a timing chart illustrating an example of an operation of the communication system according to the modification example of one example embodiment.

FIG. 18 illustrates an example of an operation of the communication system 101A. Part (A) illustrates an operation of the relay devices 11A, 11B, and 11C, i.e., the network NET. Part (B) illustrates an operation of the communication device 120A. Part (C) illustrates data transmitted by the communication device 120A. Part (D) illustrates data received by the communication device 120A.

At a timing t151, the communication cutoff period T may start. The communication device 120A may set the transmission interval of the DHCP request packet R1 to the time interval T11, e.g., three seconds. Thereafter, at a timing t152 and a timing t153, the communication device 120A may respectively transmit a first search packet P and a first DHCP request packet R1 sequentially, as illustrated in Part (C) of FIG. 18. Thereafter, the communication device 120A may transmit a search packet P and a DHCP request packet R1 intermittently at the time interval T11. At a timing t156, the relay devices 11A, 11B, and 11C may end the path search operation, as illustrated in Part (A) of FIG. 18, and the communication cutoff period T may end. The relay devices 11A, 11B, and 11C may resume the operation of relaying the network communication.

At a timing t157 and a timing t158 thereafter, the communication device 120A may respectively transmit a search packet P and a DHCP request packet R1 sequentially, as illustrated in Part (C) of FIG. 18. The communication device 120A may receive the transmitted search packet P at a timing t159, as illustrated in Part (D) of FIG. 18. This may cause the communication device 120A to determine that the communication cutoff period T has ended, and the communication device 120A may start the network communication COM, as illustrated in Parts (C) and (D) of FIG. 18. Furthermore, the communication device 120A may set the transmission interval of the DHCP request packet R1 to the time interval T12, e.g., 10 seconds.

Thereafter, at a timing t160, the communication device 120A may receive a DHCP response packet R2 transmitted from the DHCP server 12 in response to the DHCP request packet R1 transmitted at the timing t158, as illustrated in Part (D) of FIG. 18. The communication device 120A may perform network setting on the basis of the information on the assigned IP address included in the received DHCP response packet R2.

Figure 19:
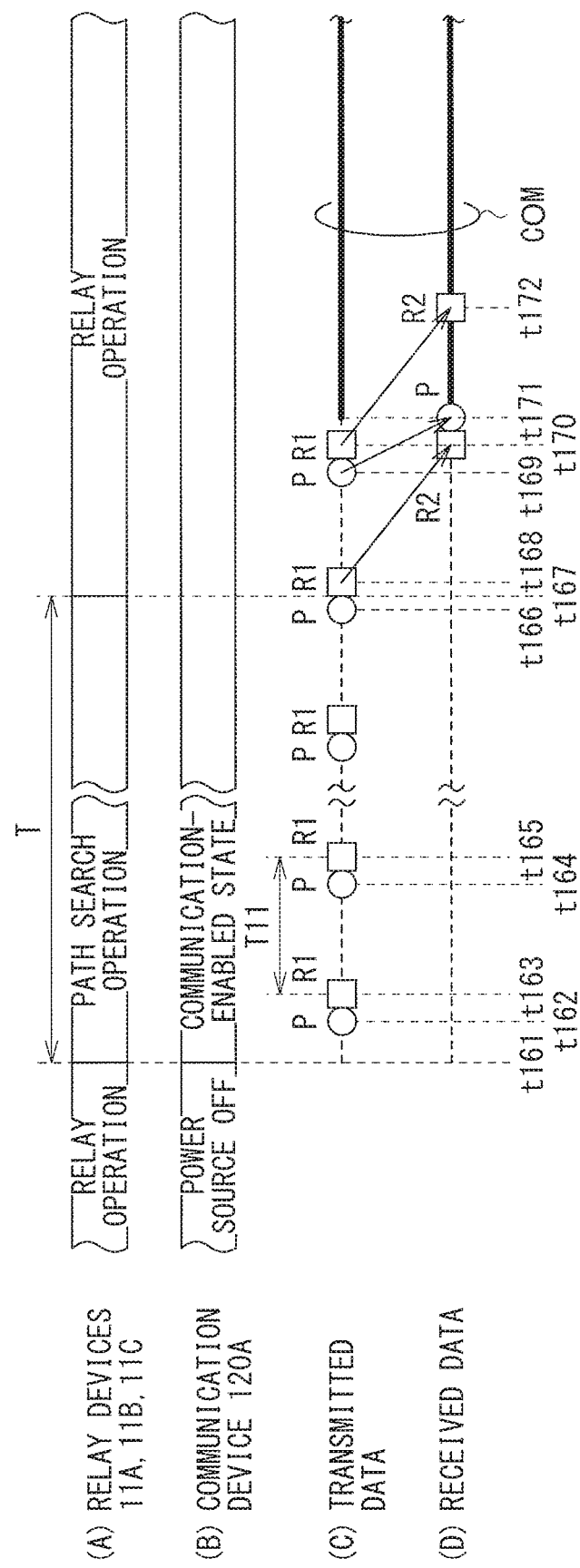
FIG. 19 is a timing chart illustrating another example of the operation of the communication system according to the modification example of one example embodiment.

FIG. 19 illustrates another example of the operation of the communication system 101A.

At a timing t161, the communication cutoff period T may start. The communication device 120A may set the transmission interval of the DHCP request packet R1 to the time interval T11, e.g., three seconds. Thereafter, at a timing t162 and a timing t163, the communication device 120A may respectively transmit a first search packet P and a first DHCP request packet R1 sequentially, as illustrated in Part (C) of FIG. 19. Thereafter, the communication device 120A may transmit a search packet P and a DHCP request packet R1 intermittently at the time interval T11. Thereafter, at a timing t167, the relay devices 11A, 11B, and 11C may end the path search operation, as illustrated in Part (A) of FIG. 19, and the communication cutoff period T may end. The relay devices 11A, 11B, and 11C may resume the operation of relaying the network communication.

In this example, at a timing t166 and a timing t168, the communication device 120A may respectively transmit a search packet P and a DHCP request packet R1 sequentially, as illustrated in Part (C) of FIG. 19. The timing t166 may precede the timing t167 at which the relay devices 11A, 11B, and 11C end the path search operation. Therefore, at the timing t166, the search packet P may be lost since the relay devices 11A, 11B, and 11C, i.e., the network NET, have cut off communication with devices other than the relay devices 11A, 11B, and 11C. In contrast, the timing t168 may come after the timing t167 at which the relay devices 11A, 11B, and 11C end the path search operation. Therefore, since the relay devices 11A, 11B, and 11C have resumed the operation of relaying the network communication at the timing t168, the DHCP request packet R1 may be transmitted to the DHCP server 12.

At a timing t169 and a timing t170, the communication device 120A may respectively transmit a search packet P and a DHCP request packet R1 sequentially, as illustrated in Part (C) of FIG. 19. The communication device 120A may receive the transmitted search packet P at a timing t171, as illustrated in Part (D) of FIG. 19. This may cause the communication device 120A to determine that the communication cutoff period T has ended, and the communication device 120A may start the network communication COM, as illustrated in Parts (C) and (D) of FIG. 19. Furthermore, the communication device 120A may set the transmission interval of the DHCP request packet R1 to the time interval T12, e.g., 10 seconds.

At the timing t170, the communication device 120A may receive a DHCP response packet R2 transmitted from the DHCP server 12 in response to the DHCP request packet R1 transmitted at the timing t168, as illustrated in Part (D) of FIG. 19. Furthermore, at a timing t172, the communication device 120A may receive a DHCP response packet R2 transmitted from the DHCP server 12 in response to the DHCP request packet R1 transmitted at the timing t170. The communication device 120A may perform network setting on the basis of the information on the assigned IP address included in these received DHCP response packets R2.

Modification Example 3-2

In the foregoing third example embodiment, the communication device 120 may start the network communication in a case where the communication device 120 has received one of the search packets P that the communication device 120 has transmitted, but this is not a limiting example. For example, the communication device 120 may start the network communication after receiving two or more search packets P of the search packets P that the communication device 120 has transmitted.

Modification Example 3-3

In the foregoing third example embodiment, the communication device 120 may stop transmitting a search packet P in a case where the communication device 120 has received any one of the search packets P that the communication device 120 has transmitted, but this is not a limiting example. For example, the communication device 120 may further transmit one or more search packets P after receiving any one of the search packets P that the communication device 120 has transmitted.

Modification Example 3-4

In the foregoing third example embodiment, the communication device 120 may transmit a DHCP request packet R1 along with a search packet P and receive a DHCP response packet R2 in response to the transmitted DHCP request packet R1, but this is not a limiting example. One example embodiment of the technology may be applied to various techniques in which a request packet is transmitted to a server and a response packet is received in response to the transmitted request packet. In a specific but non-limiting example, the communication device may transmit a Network Time Protocol (NTP) request packet along with a search packet P, for example. An NTP server may generate an NTP response packet including information on the time on the basis of the received NTP request packet and transmit the generated NTP response packet to the communication device. The communication device may receive this NTP response packet.

4. Fourth Example Embodiment

Next, a communication system 102 according to a fourth example embodiment will be described. In the fourth example embodiment, a communication device may start transmitting a plurality of search packets P and a plurality of DHCP request packets R1 intermittently upon a lapse of a standby time after the communication device and the relay device 11C become electrically coupled to each other in the communication cutoff period T. Configurations that are substantially identical to those of the communication system 101 according to the third example embodiment described above may be given identical reference characters, and descriptions thereof will be omitted as appropriate.

Figure 20:
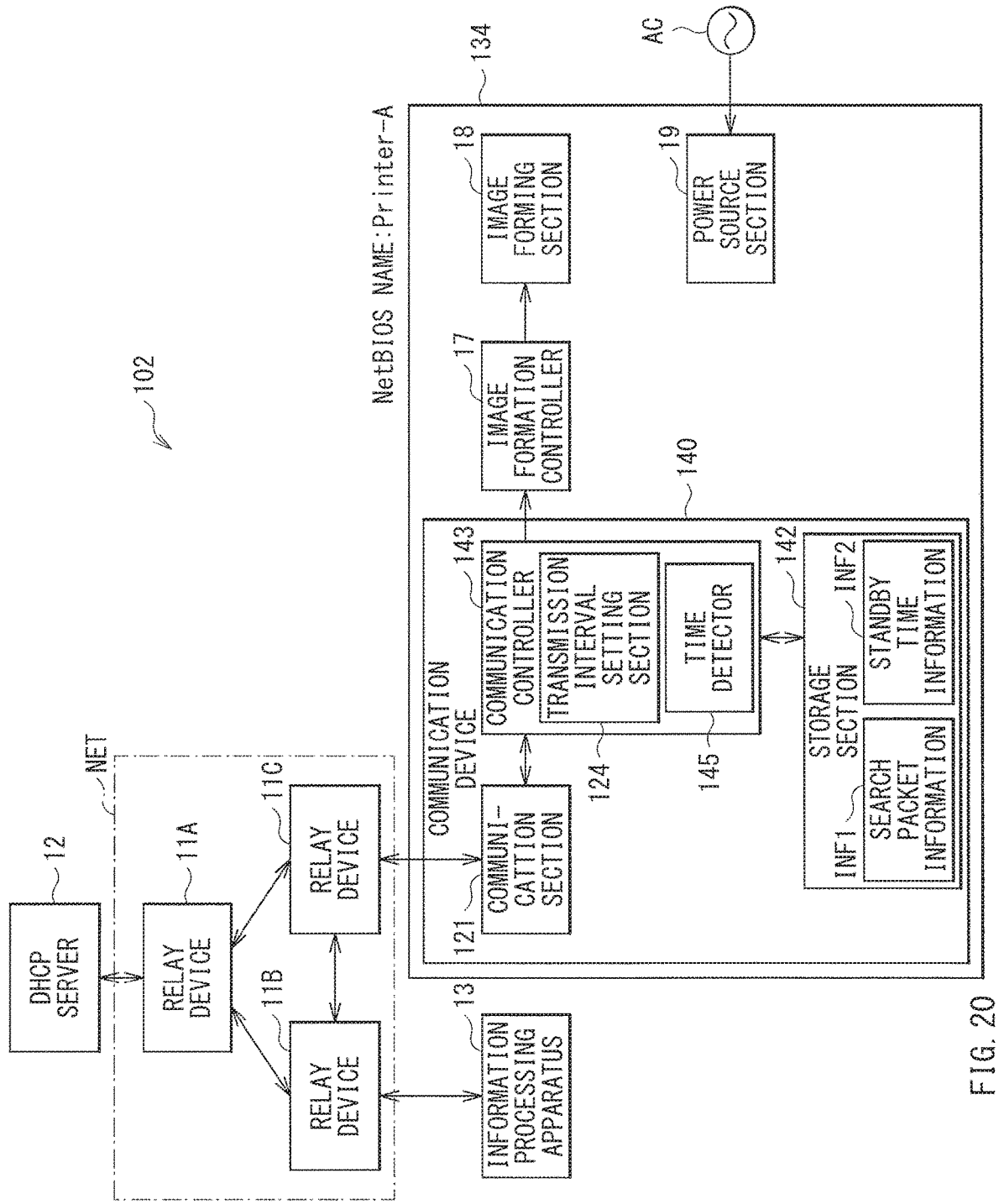
FIG. 20 is a block diagram illustrating an example of a configuration of a communication system according to one example embodiment.

FIG. 20 illustrates an example of a configuration of the communication system 102. The communication system 102 may include an image forming apparatus 134. The image forming apparatus 134 may include a communication device 140. The communication device 140 may include a storage section 142 and a communication controller 143.

The storage section 142 may hold the search packet information INF1 and the standby time information INF2. The standby time information INF2 may include information on the length of the time, i.e., the standby time T2, from a time when the communication device 140 and the relay device 11C become electrically coupled to each other to a time when a plurality of search packets P and a plurality of DHCP request packets R1 start being transmitted intermittently.

The communication controller 143 may be configured to control a communication operation of the communication device 140. The communication controller 143 may include a time detector 145. The time detector 145 may be configured to measure the receiving time T1 from a time when the communication device 140 and the relay device 11C have become electrically coupled to each other to a time when a search packet P has been received. Furthermore, the time detector 145 may calculate, on the basis of the receiving time T1, the standby time T2 to be used when the communication device 140 becomes electric ally coupled to the relay device 11C the next time. The communication controller 143 may store the information on the standby time T2 into the storage section 142 as the standby time information INF2.

For example, the communication controller 143 may perform control of causing the communication section 121 to transmit a plurality of search packets P intermittently and to transmit a plurality of DHCP request packets R1 intermittently, on the basis of the search packet information INF1 stored in the storage section 142 upon a lapse of the standby time T2 indicated by the standby time information INF2 stored in the storage section 142 after the communication device 140 and the relay device 11C have become electrically coupled to each other. Furthermore, in a case where the communication section 121 has received any of the transmitted search packets P, the communication controller 143 may perform control of causing the communication section 121 to stop transmitting a search packet P and to start the network communication.

The communication controller 143 may correspond to a "controller" in one specific but non-limiting embodiment of the technology. The storage section 142 may correspond to a "storage section" in one specific but non-limiting embodiment of the technology.

Figure 21:
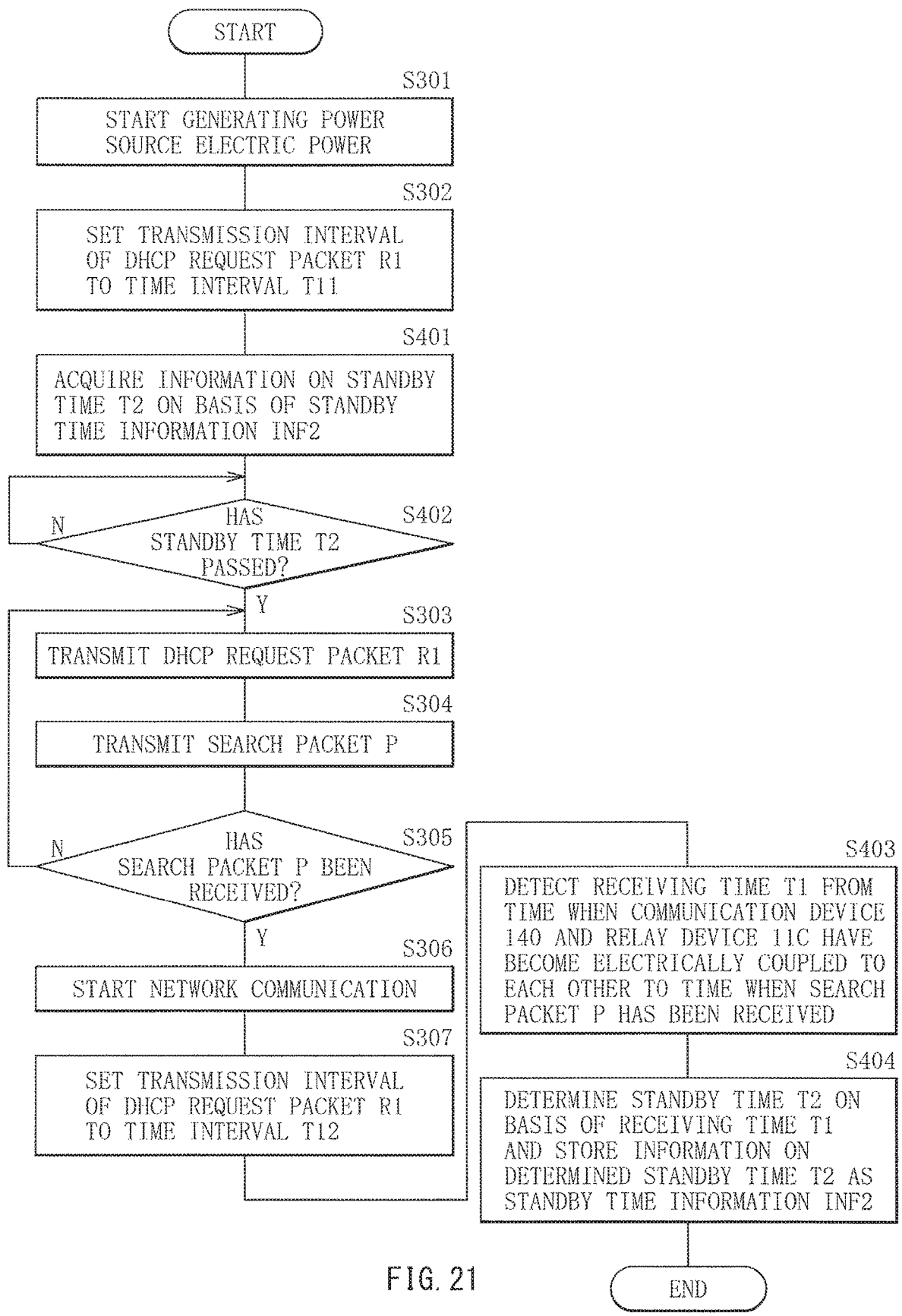
FIG. 21 is a flowchart illustrating an example of an operation of a communication device illustrated in FIG. 20.

FIG. 21 illustrates an example of an operation of the communication device 140 performed when the user turns on the power source switch of the image forming apparatus 134.

In step S301, when the user turns on the power source switch of the image forming apparatus 134, the power source section 19 may start generating a power source electric power to be used in the communication device 140, the image formation controller 17, and the image forming section 18 on the basis of an alternating-current electric power supplied from the alternating-current power source AC.

Thereafter, the transmission interval setting section 124 of the communication device 140 may set the transmission interval of the DHCP request packet R1 to the time interval T11, e.g., three seconds, in step S302. Furthermore, the transmission interval setting section 124 may set the transmission interval of the search packet P to the time interval T11.

Thereafter, in step S401, the communication controller 143 of the communication device 140 may acquire the information on the standby time T2 on the basis of the standby time information INF2 stored in the storage section 142.

Thereafter, in step S402, the communication controller 143 of the communication device 140 may determine whether the standby time T2 has passed after the communication device 140 and the relay device 11C have become electrically coupled to each other. In a case where the standby time T2 has not passed yet ("N" in step S402), the communication controller 143 may repeat step S402 until the standby time T2 passes.

In contrast, in a case where the standby time T2 has passed in step S402 ("Y" in step S402), the communication device 140 may transmit a DHCP request packet R1 in step S303. In a specific but non-limiting example, the communication controller 143 may generate a DHCP request packet R1 whose destination is set to the DHCP server 12, and the communication section 121 may transmit the generated DHCP request packet R1 through unicasting.

Thereafter, the communication device 140 may transmit a search packet P in step S304. In a specific but non-limiting example, the communication controller 143 may generate a search packet P on the basis of the search packet information INF1 stored in the storage section 142, and the communication section 121 may transmit the generated search packet P through broadcasting.

Thereafter, in step S305, the communication controller 143 of the communication device 140 may determine whether the communication section 121 has received the search packet P transmitted in step S304. In a case where the communication section 121 has not received the search packet P ("N" in step S305), the flow may return to step S303, and steps S303 to S305 may be repeated until the communication device 140 receives a search packet P.

In a case where the communication section 121 has received the search packet P in step S305 ("Y" in step S305), the communication device 140 may start the network communication in step S306. In other words, in a case where the communication section 121 has received the search packet P, the communication device 140 may determine that the communication cutoff period T has ended and start the network communication.

Thereafter, the transmission interval setting section 124 of the communication device 140 may set the transmission interval of the DHCP request packet R1 to the time interval T12, e.g., 10 seconds, which is longer than the time interval T11 in step S307. In other words, the transmission interval setting section 124 may restore the transmission interval of the DHCP request packet R1 to the time interval T12, which is a typical transmission interval, because the communication cutoff period T has ended.

Thereafter, in step S403, the time detector 145 of the communication device 140 may detect the receiving time T1 from a time when the communication device 140 and the relay device 11C have become electrically coupled to each other to a time when the search packet P has been received.

Thereafter, in step S404, the time detector 145 may calculate, on the basis of the receiving time T1 detected in step S403, the standby time T2 to be used when the communication device 140 becomes electrically coupled to the relay device 11C the next time, and the communication controller 143 may store the information on the calculated standby time T2 into the storage section 142 as the standby time information INF2.

Thus, the flow may be terminated.

Figure 22:
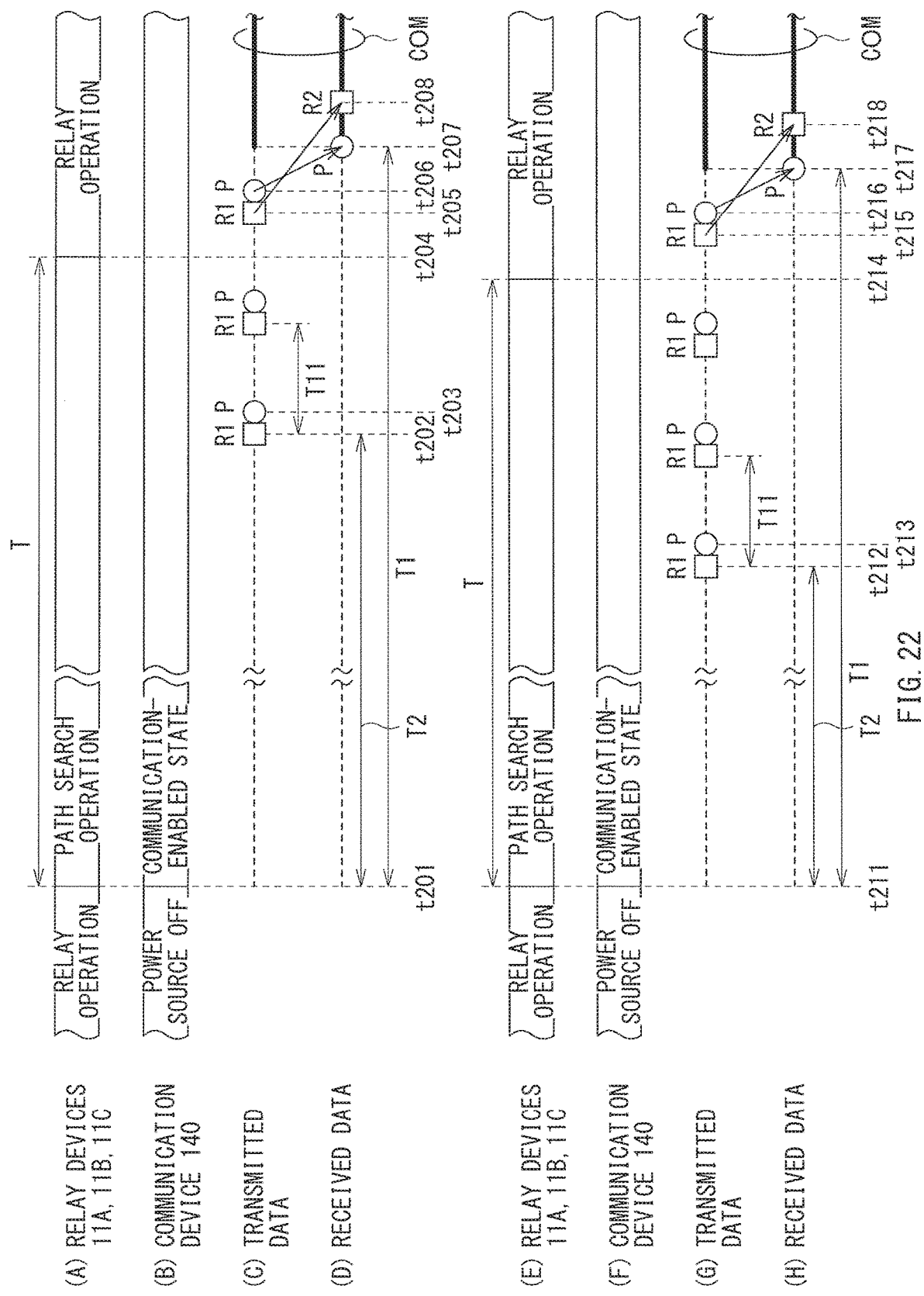
FIG. 22 is a timing chart illustrating an example of an operation of a communication system illustrated in FIG. 20.

FIG. 22 illustrates an example of an operation of the communication system 102. Parts (A) and (E) illustrate an operation of the relay devices 11A, 11B, and 11C. Parts (B) and (F) illustrate an operation of the communication device 140. Parts (C) and (G) illustrate data transmitted by the communication device 140. Parts (D) and (H) illustrate data received by the communication device 140. Parts (A) to (D) illustrate an operation performed when the user turns on the power source switch of the image forming apparatus 134. Parts (E) to (H) illustrate an operation performed when the user turns on the power source switch of the image forming apparatus 134 the next time.

In the example illustrated in Parts (A) to (D) of FIG. 22, the user may turn on the power source switch of the image forming apparatus 134 at a timing t201. This may cause the power source electric power generated by the power source section 19 to be supplied to the communication device 140, and the communication device 140 may start operating and enter the communication-enabled state, as illustrated in Part (B) of FIG. 22. When this causes the communication device 140 and the relay device 11C to become electrically coupled to each other, the relay devices 11A, 11B, and 11C may perform the path search operation with the use of the spanning tree protocol, as illustrated in Part (A) of FIG. 22. In this manner, the communication cutoff period T may start.

The transmission interval setting section 124 may set the transmission interval of the DHCP request packet R1 to the time interval T11, e.g., three seconds. The communication controller 143 may acquire the information on the standby time T2 on the basis of the standby time information INF2 stored in the storage section 142. Thereafter, the communication device 140 may respectively transmit a first DHCP request packet R1 and a first search packet P sequentially at a timing t202 and a timing t203 at which the standby time T2 has passed after the communication device 140 and the relay device 11C have become electrically coupled to each other, as illustrated in Part (C) of FIG. 22. In this example, the communication device 140 may transmit a plurality of DHCP request packets R1 and a plurality of search packets P intermittently at the time interval T11 thereafter.

At a timing t204, the relay devices 11A, 11B, and 11C may end the path search operation, as illustrated in Part (A) of FIG. 22, and the communication cutoff period T may end. The relay devices 11A, 11B, and 11C may resume the operation of relaying the network communication. At a timing t205 and a timing t206 thereafter, the communication device 140 may respectively transmit a DHCP request packet R1 and a search packet P sequentially, as illustrated in Part (C) of FIG. 22, and the communication device 140 may receive the transmitted search packet P at a timing t207, as illustrated in Part (D) of FIG. 22. This may cause the communication device 140 to determine that the communication cutoff period T has ended, and the communication device 140 may start the network communication COM, as illustrated in Parts (C) and (D) of FIG. 22. Furthermore, the communication device 140 may set the transmission interval of the DHCP request packet R1 to the time interval T12, e.g., 10 seconds.

Thereafter, at a timing t208, the communication device 140 may receive a DHCP response packet R2 transmitted from the DHCP server 12 in response to the DHCP request packet R1 transmitted at the timing t205, as illustrated in Part (D) of FIG. 22. The communication device 140 may perform network setting on the basis of the information on the assigned IP address included in the received DHCP response packet R2.

The time detector 145 may detect the receiving time T1 from a time when the communication device 140 and the relay device 11C have become electrically coupled to each other to a time when the search packet P has been received, i.e., from the timing t201 to the timing t207. Thereafter, the time detector 145 may calculate, on the basis of the detected receiving time T1, the standby time T2 to be used when the communication device 140 becomes electrically coupled to the relay device 11C the next time. In a specific but non-limiting example, the time detector 145 may calculate the standby time T2 to make the standby time T2 shorter than the receiving time T1. Thereafter, the communication controller 143 may store the information on the calculated standby time T2 into the storage section 142 as the standby time information INF2.

Thereafter, the user may turn off the power source switch of the image forming apparatus 134 after some time has passed, for example.

Thereafter, as illustrated in Parts (E) to (H) of FIG. 22, at a timing t211, the user may again turn on the power source switch of the image forming apparatus 134. This may cause the power source electric power generated by the power source section 19 to be supplied to the communication device 140, and the communication device 140 may start operating and enter the communication-enabled state, as illustrated in Part (F) of FIG. 22. When this causes the communication device 140 and the relay device 11C to become electrically coupled to each other, the relay devices 11A, 11B, and 11C may perform the path search operation with the use of the spanning tree protocol, as illustrated in Part (E) of FIG. 22. In this manner, the communication cutoff period T may start.

The transmission interval setting section 124 may set the transmission interval of the DHCP request packet R1 to the time interval T11, e.g., three seconds. The communication controller 143 may acquire the information on the standby time T2 on the basis of the standby time information INF2 stored in the storage section 142. Thereafter, the communication device 140 may respectively transmit a first DHCP request packet R1 and a first search packet P sequentially at a timing t212 and a timing t213 at which the standby time T2 has passed after the communication device 140 and the relay device 11C have become electrically coupled to each other, as illustrated in Part (G) of FIG. 22. In this example, the communication device 140 may transmit a plurality of DHCP request packets R1 and a plurality of search packets P intermittently at the time interval T11 thereafter.

At a timing t214, the relay devices 11A, 11B, and 11C may end the path search operation, as illustrated in Part (E) of FIG. 22, and the communication cutoff period T may end. The relay devices 11A, 11B, and 11C may resume the operation of relaying the network communication. In other words, the path search operation may end in a shorter time in this example than in the previous operation illustrated in Parts (A) to (D) of FIG. 22. At a timing t215 and a timing t216 thereafter, the communication device 140 may respectively transmit a DHCP request packet R1 and a search packet P sequentially, as illustrated in Part (G) of FIG. 22, and the communication device 140 may receive the transmitted search packet P at a timing t217, as illustrated in Part (H) of FIG. 22. This may cause the communication device 140 to determine that the communication cutoff period T has ended, and the communication device 140 may start the network communication COM, as illustrated in Parts (G) and (H) of FIG. 22. Furthermore, the communication device 140 may set the transmission interval of the DHCP request packet R1 to the time interval T12, e.g., 10 seconds.

Thereafter, at a timing t218, the communication device 140 may receive a DHCP response packet R2 transmitted from the DHCP server 12 in response to the DHCP request packet R1 transmitted at the timing t215, as illustrated in Part (H) of FIG. 22. The communication device 140 may perform network setting on the basis of the information on the assigned IP address included in the received DHCP response packet R2.

Thereafter, the time detector 145 may detect the receiving time T1 from a time when the communication device 140 and the relay device 11C have become electrically coupled to each other to a time when the search packet P has been received, i.e., from the timing t211 to the timing t217, and calculate, on the basis of the detected receiving time T1, the standby time T2 to be used when the communication device 140 becomes electrically coupled to the relay device 11C the next time. Thereafter, the communication controller 143 may store the information on the calculated standby time T2 into the storage section 142 as the standby time information INF2.

Figure 23:
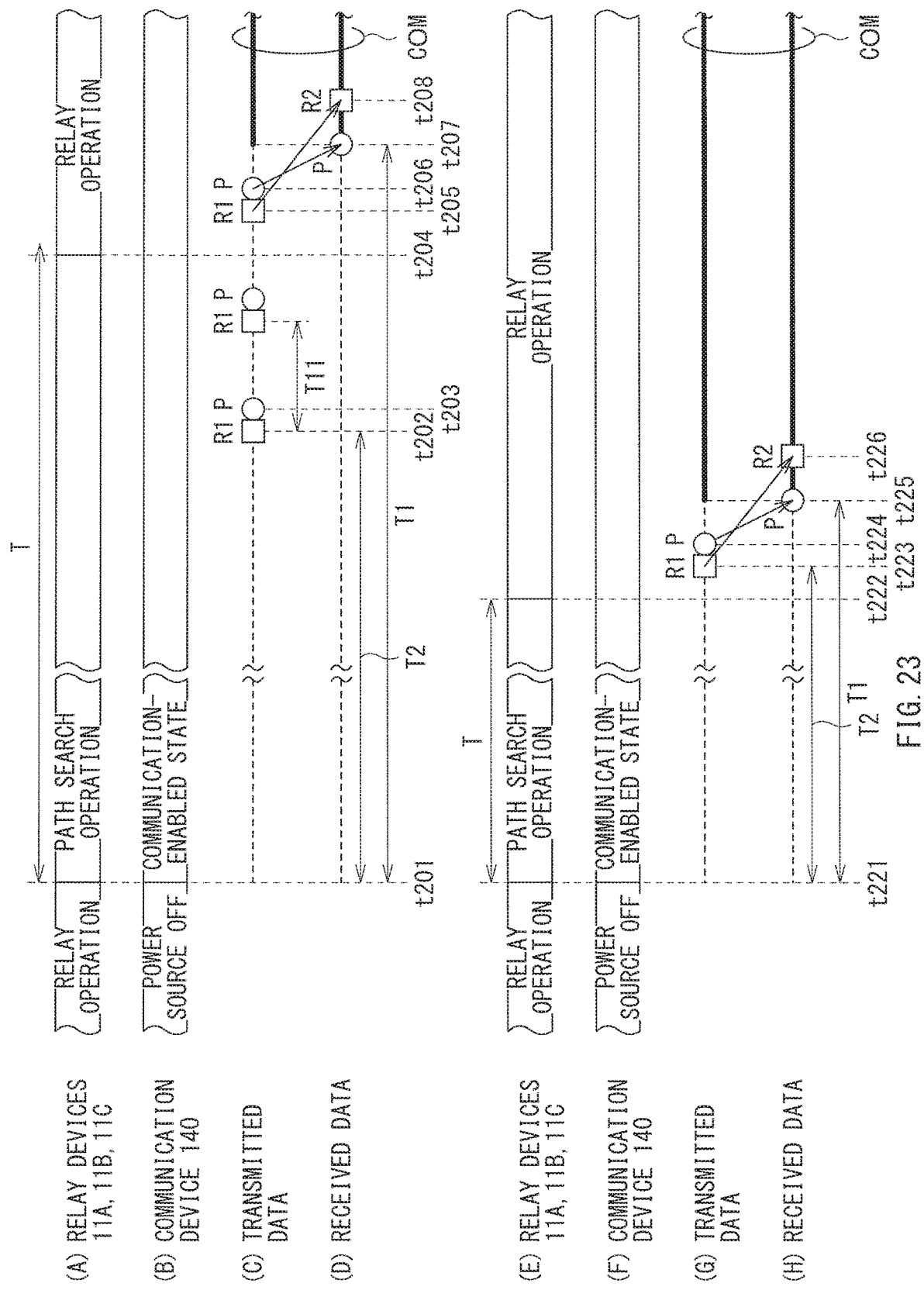
FIG. 23 is a timing chart illustrating another example of the operation of the communication system illustrated in FIG. 20.

FIG. 23 illustrates another example of the operation of the communication system 102. Parts (A) to (D) of FIG. 23 may be the same as Parts (A) to (D) of FIG. 22.

In the example illustrated in Parts (E) to (H) of FIG. 23, the relay devices 11A, 11B, and 11C may perform the path search operation with the use of the spanning tree protocol during a period from a timing t221 to a timing t222, as illustrated in Part (E) of FIG. 23. The path search operation may end in a shorter time in this example than in the case illustrated in Parts (E) to (H) of FIG. 22.

The communication device 140 may respectively transmit a first DHCP request packet R1 and a first search packet P sequentially at a timing t223 and a timing t224 at which the standby time T2 has passed after the communication device 140 and the relay device 11C have become electrically coupled to each other, as illustrated in Part (G) of FIG. 23. Thereafter, the communication device 140 may receive the transmitted search packet P at a timing t225, as illustrated in Part (H) of FIG. 23. This may cause the communication device 140 to determine that the communication cutoff period T has ended, and the communication device 140 may start the network communication, as illustrated in Parts (G) and (H) of FIG. 23. Furthermore, the communication device 140 may set the transmission interval of the DHCP request packet R1 to the time interval T12, e.g., 10 seconds.

Thereafter, at a timing t226, the communication device 140 may receive a DHCP response packet R2 transmitted from the DHCP server 12 in response to the DHCP request packet R1 transmitted at the timing t223, as illustrated in Part (H) of FIG. 23. The communication device 140 may perform network setting on the basis of the information on the assigned IP address included in the received DHCP response packet R2.

Thereafter, the time detector 145 may detect the receiving time T1 from a time when the communication device 140 and the relay device 11C have become electrically coupled to each other to a time when the search packet P has been received, i.e., from the timing t221 to the timing t225, and calculate, on the basis of the detected receiving time T1, the standby time T2 to be used when the communication device 140 becomes electrically coupled to the relay device 11C the next time. Thereafter, the communication controller 143 may store the information on the calculated standby time T2 into the storage section 142 as the standby time information INF2.

In this manner, the communication device 140 may start transmitting a plurality of search packets P and a plurality of DHCP request packets R1 upon a lapse of the standby time T2 after the communication device 140 and the relay device 11C have become electrically coupled to each other. This allows an unnecessary search packet P or unnecessary DHCP request packet R1 to be kept from being transmitted. It is therefore possible to reduce the load on the communication device 140.

Furthermore, the communication device 140 may detect the receiving time T1 from a time when the communication device 140 and the relay device 11C have become electrically coupled to each other to a time when the search packet P has been received and calculate, on the basis of the detected receiving time T1, the standby time T2 to be used when the communication device 140 becomes electrically coupled to the relay device 11C the next time. This allows the communication device 140 to obtain the standby time T2 corresponding to the length of the communication cutoff period T in the communication system 102. Therefore, it is possible to appropriately set the timing of starting the network communication, as compared with a case where a fixed predetermined time is set for the standby time T2, for example.

In a specific but non-limiting example, the communication device 140 may calculate the standby time T2 to make the standby time T2 shorter than the receiving time T1. This makes it possible to reduce the time leading up to the start of the network communication in a case where the duration in which the path search operation is performed is decreased as the configuration of the network is changed as illustrated in FIG. 22, for example, and where the communication cutoff period T is decreased. In other words, in a case where a fixed standby time T2 is used, for example, when the duration for which the path search operation is performed is decreased as the configuration of the network is changed, for example, the time from a time when the path search operation ends to a time when a first search packet P is transmitted may be wasted. In contrast, the communication device 140 may calculate the standby time T2 to make the standby time T2 shorter than the receiving time T1. This makes it possible to start transmitting a plurality of search packets P before the path search operation ends, as illustrated in FIG. 22, for example. As a result, it is possible to reduce the time leading up to the start of network communication from the end of the communication cutoff period T in the communication device 140.

As described thus far, in the fourth example embodiment, a plurality of search packets and a plurality of DHCP request packets may start being transmitted upon a lapse of the standby time after the communication device and the relay device have become electrically coupled to each other. This allows an unnecessary search packet to be kept from being transmitted. It is therefore possible to reduce the load on the communication device.

In the fourth example embodiment, the receiving time from a time when the communication device and the relay device become electrically coupled to each other to a time when the search packet is received may be detected and, on the basis of the detected receiving time, the standby time to be used when the communication device becomes electrically coupled to the relay device 11C the next time may be calculated. This makes it possible to obtain the standby time corresponding to the length of the communication cutoff period in the communication system. Accordingly, it is possible to appropriately set the timing of starting the network communication.

In the fourth example embodiment, the standby time may be calculated to make the standby time shorter than the receiving time. It is therefore possible to reduce the time leading up to the start of the network communication.

Other effects may be similar to those in the third example embodiment described above.

Modification Example 4-11

Each modification example of the third example embodiment described above may be applied to the communication device 140 according to the foregoing fourth example embodiment. For example, in the communication device 140 according to the foregoing fourth example embodiment, a DHCP request packet R1 may be transmitted immediately before a search packet P is transmitted, but this is not a limiting example. Alternatively, a DHCP request packet R1 may be transmitted immediately after a search packet P has been transmitted, as in the communication device 120A according to the modification example 3-1, as illustrated in FIGS. 16 to 19, for example.

Thus far, one embodiment of the technology has been described with reference to some example embodiments and modification examples. The technology, however, is not limited to these example embodiments and modification examples, and various other alterations can be made.

For example, one embodiment of the technology has been applied to an image forming apparatus in each of the foregoing example embodiments, but this is not a limiting example. The technology may also be applied to various network apparatuses that include a network interface.

Furthermore, the technology encompasses any possible combination of some or all of the various embodiments and the modifications described herein and incorporated herein. It is possible to achieve at least the following configurations from the above-described example embodiments of the technology.

(1)

A communication device, including:

a communication section that is communicable with a network apparatus via a relay device; and a controller that controls an operation of the communication section, thereby causes the communication section to transmit one or more search packets to the relay device, and causes the communication section to start communicating with the network apparatus after receiving any of the one or more search packets, the one or more search packets including the communication section as a transmission target.

(2)

The communication device according to (1), in which the controller performs control of causing the communication section to start transmitting the one or more search packets in a case where the communication section and the relay device become electrically coupled to each other.

(3)

The communication device according to (2), in which the relay device cuts off communication between the communication section and the relay device temporarily in the case where the communication section and the relay device become electrically coupled to each other.

(4)

The communication device according to (2) or (3), in which the communication section and the relay device become electrically coupled to each other by supplying of a power source to the communication section and physical coupling of the communication section and the relay device to each other.

(5)

The communication device according to any one of (1) to (4), in which the controller further performs control of causing the communication section to start communicating with the network apparatus in a case where the communication section receives a packet different from the search packet.

(6)

The communication device according to (1), further including a storage section that holds standby time information indicating a standby time from a time when the communication section and the relay device become electrically coupled to each other to a time when the communication section starts transmitting the one or more search packets, in which the controller determines, on the basis of the standby time information, a timing at which the communication section starts transmitting the one or more search packets.

(7)

The communication device according to (6), in which the controller measures a receiving time, calculates the standby time on the basis of the receiving time, and stores the standby time information indicating the standby time into the storage section, the receiving time being from the time when the communication section and the relay device become electrically coupled to each other to a time when any of the one or more search packets is received.

(8)

The communication device according to (7), in which the controller calculates the standby time and thereby makes the standby time shorter than the receiving time.

(9)

The communication device according to (1), in which the controller sets a transmission interval of a request packet to a first time interval, performs control of causing the communication section to transmit one or more the request packets in addition to the one or more search packets to the relay device, and sets the transmission interval of the request packet to a second time interval after the communication section receives any of the one or more search packets, the request packet requesting information from the network apparatus, the second time interval being longer than the first time interval.

(10)

The communication device according to (9), in which the controller performs control of causing the communication section to start transmitting the one or more search packets and the one or more request packets in the case where the communication section and the relay device become electrically coupled to each other.

(11)

The communication device according to (10), in which the relay device cuts off communication between the communication section and the relay device temporarily in the case where the communication section and the relay device become electrically coupled to each other.

(12)

The communication device according to (10) or (11), in which the communication section and the relay device become electrically coupled to each other by supplying of a power source to the communication section and physical coupling of the communication section and the relay device to each other.

(13)

The communication device according to any one of (9) to (12), in which the communication section receives a response packet transmitted from the network apparatus on the basis of any of the one or more request packets.

(14)

The communication device according to (13), in which the response packet includes network identification information to be assigned to the communication section, and the controller performs network setting on the basis of the network identification information.

(15)

The communication device according to any one of (9) to (14), in which the controller sets the transmission interval of the search packet to the first time interval.

(16)

The communication device according to (9), further including a storage section that holds standby time information indicating a standby time from a time when the communication section and the relay device become electrically coupled to each other to a time when the communication section starts transmitting the one or more search packets and the one or more request packets, in which the controller determines, on the basis of the standby time information, a timing at which the communication section starts transmitting the one or more search packets and the one or more request packets.

(17)

The communication device according to (16), in which the controller measures a receiving time, calculates the standby time on the basis of the receiving time, and stores the standby time information indicating the standby time into the storage section, the receiving time being from the time when the communication section and the relay device become electrically coupled to each other to a time when any of the one or more search packets is received.

(18)

The communication device according to (17), in which the controller calculates the standby time and thereby makes the standby time shorter than the receiving time.

(19)

A communication method, including:

transmitting one or more search packets to a relay device, the one or more search packets including a sender of the one or more search packets as a transmission target; and starting communicating with a network apparatus via the relay device after receiving any of the one or more search packets.

(20)

The communication method according to (19), further including: setting a transmission interval of a request packet to a first time interval, the request packet requesting information from the network apparatus;

transmitting, to the relay device, one or more the request packets in addition to the one or more search packets; and setting the transmission interval of the request packets to a second time interval after receiving any of the one or more search packets, the second time interval being longer than the first time interval.

According to the communication device and the communication method of one embodiment of the technology, one or more search packets including the sender of the one or more search packets as the transmission target are transmitted to the relay device, and communication with the network apparatus is started after receiving any of the one or more search packets. Accordingly, it is possible to reduce the time leading up to the start of the network communication.

What is claimed is:

1. A communication device, comprising:
    a communication circuit that is communicable with a network apparatus via a relay device;
    a controller that controls an operation of the communication circuit, thereby causes the communication circuit to transmit one or more search packets and one or more request packets to the relay device in a period in which the relay device cuts off communication, and causes the communication circuit to start communicating with the network apparatus after receiving any of the one or more search packets, the one or more search packets including the communication-circuit as a transmission target, the one or more request packets requesting information from the network apparatus via the relay device, wherein
    the controller sets, in the period in which the relay device cuts off the communication, a transmission interval of the one or more request packets to a first time interval,
    the controller sets the transmission interval of the one or more request packets to a second time interval that is longer than the first time interval in response to the communication circuit receiving any of the one or more search packets, and
    the second time interval is a transmission interval in which the communication circuit transmits the one or more request packets in a case where the relay device performs a relay operation; and
    a storage that holds standby time information indicating a standby time from a time when the communication circuit and the relay device become electrically coupled to each other to a time when the communication circuit starts transmitting the one or more search packets and the one or more request packets, wherein
    the controller determines, on a basis of the standby time information, a timing at which the communication circuit starts transmitting the one or more search packets and the one or more request packets.

2. The communication device according to claim 1, wherein the controller performs control of causing the communication circuit to start transmitting the one or more search packets and the one or more request packets in the case where the communication circuit and the relay device become electrically coupled to each other.

3. The communication device according to claim 2, wherein the relay device cuts off communication between the communication circuit and the relay device temporarily in the case where the communication circuit and the relay device become electrically coupled to each other.

4. The communication device according to claim 2, wherein the communication circuit and the relay device become electrically coupled to each other by supplying of a power source to the communication circuit and physical coupling of the communication circuit and the relay device to each other.

5. The communication device according to claim 1, wherein the communication circuit receives a response packet transmitted from the network apparatus on a basis of any of the one or more request packets.

6. The communication device according to claim 5, wherein the response packet includes network identification information to be assigned to the communication circuit, and the controller performs network setting on a basis of the network identification information.

7. The communication device according to claim 1, wherein the controller sets the transmission interval of the search packet to the first time interval.

8. The communication device according to claim 1, wherein the controller measures a receiving time, calculates the standby time on a basis of the receiving time, and stores the standby time information indicating the standby time into the storage, the receiving time being from the time when the communication circuit and the relay device become electrically coupled to each other to a time when any of the one or more search packets is received.

9. The communication device according to claim 8, wherein the controller calculates the standby time and thereby makes the standby time shorter than the receiving time.

10. A communication method, comprising:
- setting, in a period in which a relay device cuts off communication, a transmission interval of one or more request packets to a first time interval, the one or more request packets requesting information from a network apparatus via the relay device;
- transmitting, in the period in which the relay device cuts off the communication, one or more search packets and the one or more request packets to the relay device, the one or more search packets including a sender of the one or more search packets as a transmission target;
- starting communicating with the network apparatus via the relay device after receiving any of the one or more search packets;
- setting the transmission interval of the one or more request packets to a second time interval that is longer than the first time interval in response to receiving any of the one or more search packets, wherein
- the second time interval is a transmission interval of transmitting the one or more request packets in a case where the relay device performs a relay operation;
- storing standby time information indicating a standby time from a time between electrically coupling to the relay device and starting transmission of the one or more search packets and the one or more request packets; and
- determining, on a basis of the standby time information, a timing at which to start transmitting the one or more search packets and the one or more request packets.

* * * * *